(12) United States Patent
Kerr et al.

(10) Patent No.: US 11,907,717 B2
(45) Date of Patent: *Feb. 20, 2024

(54) TECHNIQUES FOR EFFICIENTLY TRANSFERRING DATA TO A PROCESSOR

(71) Applicant: NVIDIA Corporation, Santa Clara, CA (US)

(72) Inventors: Andrew Kerr, Santa Clara, CA (US); Jack Choquette, Palo Alto, CA (US); Xiaogang Qiu, San Jose, CA (US); Omkar Paranjape, Austin, TX (US); Poornachandra Rao, Cedar Park, TX (US); Shirish Gadre, Fremont, CA (US); Steven J. Heinrich, Madison, AL (US); Manan Patel, San Jose, CA (US); Olivier Giroux, Santa Clara, CA (US); Alan Kaatz, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,374

(22) Filed: Feb. 8, 2023

(65) Prior Publication Data
US 2023/0185570 A1 Jun. 15, 2023

Related U.S. Application Data

(62) Division of application No. 17/363,561, filed on Jun. 30, 2021, now Pat. No. 11,604,649, which is a
(Continued)

(51) Int. Cl.
*G06F 9/30* (2018.01)
*G06F 9/52* (2006.01)
(Continued)

(52) U.S. Cl.
CPC ........ *G06F 9/30043* (2013.01); *G06F 9/3009* (2013.01); *G06F 9/522* (2013.01);
(Continued)

(58) Field of Classification Search
CPC .... G06F 9/30043; G06F 9/3009; G06F 9/522; G06F 12/0808; G06F 12/0888; G06F 9/3004
See application file for complete search history.

(56) References Cited

U.S. PATENT DOCUMENTS 7,634,621 B1 12/2009 Coon et al.
7,680,988 B1 3/2010 Nickolls et al.
(Continued)

OTHER PUBLICATIONS

CUDA C Programming Guide, PG-02829-001_v10.2 | Nov. 2019 https://docs.nvidia.com/cuda/cuda-c-programming-guide/index.html.
(Continued)

*Primary Examiner* — Corey S Faherty
(74) *Attorney, Agent, or Firm* — Nixon & Vanderhye, P.C.

(57) ABSTRACT

A technique for block data transfer is disclosed that reduces data transfer and memory access overheads and significantly reduces multiprocessor activity and energy consumption. Threads executing on a multiprocessor needing data stored in global memory can request and store the needed data in on-chip shared memory, which can be accessed by the threads multiple times. The data can be loaded from global memory and stored in shared memory using an instruction which directs the data into the shared memory without storing the data in registers and/or cache memory of the multiprocessor during the data transfer.

21 Claims, 17 Drawing Sheets

Related U.S. Application Data division of application No. 16/712,083, filed on Dec. 12, 2019, now Pat. No. 11,080,051.

(60) Provisional application No. 62/927,417, filed on Oct. 29, 2019, provisional application No. 62/927,511, filed on Oct. 29, 2019.

(51) Int. Cl.
*G06F 12/0808* (2016.01)
*G06F 12/0888* (2016.01)

(52) U.S. Cl.
CPC ...... *G06F 12/0808* (2013.01); *G06F 12/0888* (2013.01); *G06F 9/3004* (2013.01)

(56) References Cited

U.S. PATENT DOCUMENTS

| | | |
|---|---|---|
| 7,689,989 B2 | 3/2010 | Dostert |
| 7,941,585 B2 | 5/2011 | Asher et al. |
| 8,108,625 B1 | 1/2012 | Coon et al. |
| 8,381,203 B1 | 2/2013 | Beylin et al. |
| 8,555,035 B1 | 10/2013 | Patney et al. |
| 9,069,664 B2 | 1/2015 | Dally |
| 9,117,284 B2 | 8/2015 | Nienhaus et al. |
| 9,158,595 B2 | 10/2015 | Lindholm et al. |
| 9,442,755 B2 | 9/2016 | Lindholm et al. |
| 9,448,803 B2 | 9/2016 | Lindholm et al. |
| 10,002,031 B2 | 6/2018 | Llamas et al. |
| 10,013,290 B2 | 7/2018 | Jones |
| 10,217,183 B2 | 2/2019 | Palmer et al. |
| 10,318,435 B2 | 6/2019 | Guthrie |
| 10,585,667 B2 | 3/2020 | Grochowski |
| 2004/0015622 A1 | 1/2004 | Avery |
| 2006/0026309 A1 | 2/2006 | Day |
| 2007/0073921 A1 | 3/2007 | Vemula |
| 2014/0310484 A1 | 10/2014 | Giroux |
| 2015/0020558 A1 | 1/2015 | Williams |
| 2017/0052976 A1 | 2/2017 | Verma |
| 2017/0177501 A1 | 6/2017 | Guthrie |
| 2017/0293565 A1 | 10/2017 | Priyadarshi |
| 2018/0322077 A1 | 11/2018 | Qiu et al. |
| 2018/0322078 A1 | 11/2018 | Qiu et al. |
| 2019/0065401 A1 | 2/2019 | Dormitzer |

OTHER PUBLICATIONS

CUTLASS: Fast Linear Algebra in CUDA C++, Dec. 5, 2017 (Updated May 21, 2018), https://devblogs.nvidia.com/cutlass-linear-algebra-cuda/.

Xiao et al, "Inter-Block GPU Communication via Fast Barrier Synchronization," 2010 IEEE International Symposium on Parallel & Distributed Processing (IPDPS) (Apr. 19-23, 2010).

Fujii, Yusuke & Azumi, Takuya & Nishio, Nobuhiko & Kato, Shinpei & Edahiro, Masato. (2013). Data Transfer Matters for GPU Computing. Proceedings of the International Conference on Parallel and Distributed Systems—ICPADS. 275-282.

M. Gebhart, S. W. Keckler, B. Khailany, R. Krashinsky and W. J. Dally, "Unifying Primary Cache, Scratch, and Register File Memories in a Throughput Processor," 2012 45th Annual IEEE/ACM International Symposium on Microarchitecture, Vancouver, BC, 2012, pp. 96-106.

A. Nery, N. Nedjah and F. Franca, "Two Alternative Parallel Implementations for Ray Tracing: OPENMP and MPI", Mecanica Computacional, Buenos Aires, Argentina, Nov. 15-18, 2010, vol. XXIX, pp. 6295-6302.

Using CUDA Warp-Level Primitives, by Yuan Lin and Vinod Grover, Jan. 15, 2018, https://devblogs.nvidia.com/using-cuda-warp-level-primitives/.

C. Li, Y. Yang, H. Dai, S. Yan, F. Mueller and H. Zhou, "Understanding the tradeoffs between software-managed vs. hardware-managed caches in GPUS," 2014 IEEE International Symposium on Performance Analysis of Systems and Software (ISPASS), Monterey, CA, 2014, pp. 231-242.

| Sector Pattern | Shared sector to write given pattern and fill mask bit | | | |
|---|---|---|---|---|
| | 0 | 1 | 2 | 3 |
| 0123 | 0 | 1 | 2 | 3 |
| 0321 | 0 | 3 | 2 | 1 |
| 1032 | 1 | 0 | 3 | 2 |
| 1230 | 1 | 2 | 3 | 0 |
| 2103 | 2 | 1 | 0 | 3 |
| 2301 | 2 | 3 | 0 | 1 |
| 3012 | 3 | 0 | 1 | 2 |
| 3210 | 3 | 2 | 1 | 0 |

FIG. 7

TECHNIQUES FOR EFFICIENTLY TRANSFERRING DATA TO A PROCESSOR

This application is a divisional of application Ser. No. 17/363,561, filed Jun. 30, 2021, which is a divisional of application Ser. No. 16/712,083, filed Dec. 12, 2019, now U.S. Pat. No. 11,080,051, which claims priority to U.S. Provisional Application Nos. 62/927,417 and 62/927,511 both filed Oct. 29, 2019, the entire contents of which are hereby incorporated by reference.

CROSS-REFERENCE TO RELATED APPLICATIONS

This application is related to commonly-assigned U.S. patent application Ser. No. 16/712,236, filed on Dec. 12, 2019, which is herby incorporated herein by reference.

FIELD

This technology relates to efficient use of processor memory, and to processor instruction set architectures (ISAs) including instructions that facilitate such efficient use. More particularly, the technology herein relates to efficient storage of data in memory shared by multiple cores, and to specialized or additional memory access instructions that reduce register pressure during memory transfer and/or data transfer latency.

BACKGROUND

Massively parallel high performance multithreaded multicore processing systems—systems that contain many processing cores operating in parallel—process data much more quickly than was possible in the past. These processing systems can break down complex computations into smaller tasks which can then be concurrently performed by multiple parallel processing cores. This "divide and conquer" approach allows complex computations to be performed in a small fraction of the time that would be required when only one or a few processors work on the same computations in order.

As the number of concurrently processed tasks has increased, the amount of data needed to support these many parallel computations has also increased, creating a data access bottleneck in "near" on-chip memory.

Modern processing chip(s) such as GPUs typically contain significant amounts of memory near the parallel processors—reducing memory access latency. For example, as of this filing, some NVIDIA GPUs contain on the order of 12 GB or more of local on-chip high bandwidth memory (including e.g., 4 GB of cache/shared memory) to serve over 5000 cores operating in parallel.

To further reduce data access latency, modern processing systems typically organize memory in a hierarchy (e.g., Level 1 (L1) cache, Level 2 (L2) cache, Level 3 (L3) cache, main memory, etc.). Such memory hierarchies store data the processing cores are currently working on closer to those processing cores so that it is more readily available. Cache memory closest to the processing cores, e.g., L1 cache, can be partitioned, distributed or otherwise organized so that each processing core or set of processing cores has exclusive access to its own cache, avoiding wait times due to memory contention with other cores. Such cache memory is often supported by hardware circuitry that maintains tags and takes care of automatically writing "dirty" cache lines back to main memory before the lines are flushed—saving the software programmer from the need to explicitly manage the cache.

There is also a need for sharing local memory between processing cores. Sometimes, a processing core(s) needs access to one or more values computed by a different processing core(s) or use memory as a communication channel to signal another processing core. While one core could write data back to main memory for access by another core, accessing main memory often takes thousands of cycles. The hierarchical cache memory architecture can sometimes be used to share such data between processors without waiting on main memory access. However, to make data sharing between multiprocessors more convenient, modern GPUs are often provided with local on-chip memory that is shared among processing cores. Furthermore, such shared memory is often supported/accelerated by copy (direct memory access or DMA) hardware.

Using shared memory in addition to or instead of cache memory can provide certain advantages. For example, applications utilizing shared memory enable more coalesced accesses and can achieve higher degrees of memory-level parallelism. See for example the following technical article that is incorporated herein by reference as if expressly set forth: C. Li, Y. Yang, H. Dai, S. Yan, F. Mueller and H. Zhou, "Understanding the tradeoffs between software-managed vs. hardware-managed caches in GPUs," 2014 IEEE International Symposium on Performance Analysis of Systems and Software (ISPASS), Monterey, CA, 2014, pp. 231-242.

In some systems, a block of physical memory can be flexibly allocated between different local memory functions such as for example between shared memory and cache memory. As one example, an embodiment of the NVIDIA Turing/Volta GPU architecture offers a software programming option to dynamically (at run time) tune local memory allocation. Specifically, the NVIDIA Volta architecture combines the functionality of the L1 and texture caches into a unified L1/Texture cache which acts as a coalescing buffer for memory accesses, gathering up the data requested by the threads of a warp prior to delivery of that data to the warp. In the Volta architecture, the L1 cache, texture cache, and shared memory are backed by a combined data cache. The portion of the combined data cache dedicated to shared memory (known in CUDA as the "carveout") can be selected at runtime using a CUDA instruction cudaFuncSetAttribute( ) with the attribute cudaFuncAttributePreferredSharedMemoryCarveout, which effectively selects how much shared memory should be allocated to each streaming multiprocessor (SM).

A benefit of the union of L1 cache with shared memory is improved latency and bandwidth. For many applications, this approach narrows the performance gap between explicitly managed shared memory and direct access to device memory. Such shared memory allows parallel threads executing on same or different processing cores to temporarily store and exchange data. Shared memory thus provides a communication mechanism enabling independent threads to communicate with one another. Also, the cost of register spills is lower, and the balance of occupancy versus spilling can be re-evaluated to provide best performance.

Traditionally, storing data from main memory into shared memory requires a multi-step process. First, the processor performs a memory load instruction from main memory, which results in addressed data being read from the main memory, stored into a cache line(s) of cache memory, and then written from the cache memory into one or more registers of the processor. Such registers may be allocated within a register file (which may be another block of local memory)—with different registers within the register file allocated to different processors or processor cores. The processor may then execute a store instruction to store the data now within its register(s) to shared memory.

Such a traditional approach for loading data into the shared memory can, in the case of large data transfers needed for certain common transactions such as matrix multiplications, consume a large number of registers for an extended and often indeterminate period of time. During this time (which in some cases can last for thousands of cycles due to long latency of main memory or other dependencies), the registers may be tied up and unavailable for use by any other purpose. Such register tie-up may prevent the associated processors from doing useful work until the registers are released.

Accordingly, although utilizing shared memory for certain computations can reduce data availability bottlenecks, existing methods for moving data into and out of shared memory often consumes resources (i.e., registers) which could otherwise be used for data processing—which slows down the overall processing rate of the processing system when certain data-intensive computations are performed. There is thus a need to manage memory bandwidth demands more efficiently while still achieving increased math throughput in areas such as Artificial Intelligence (AI) and deep learning (DL).

BRIEF DESCRIPTION OF THE DRAWINGS

The following detailed description of exemplary non-limiting illustrative embodiments is to be read in conjunction with the drawings of which:

FIG. 7 shows exemplary sector patterns that may be applied with shared memory including four sectors.

DETAILED DESCRIPTION OF EXAMPLE NON-LIMITING EMBODIMENTS

Figure 1A:
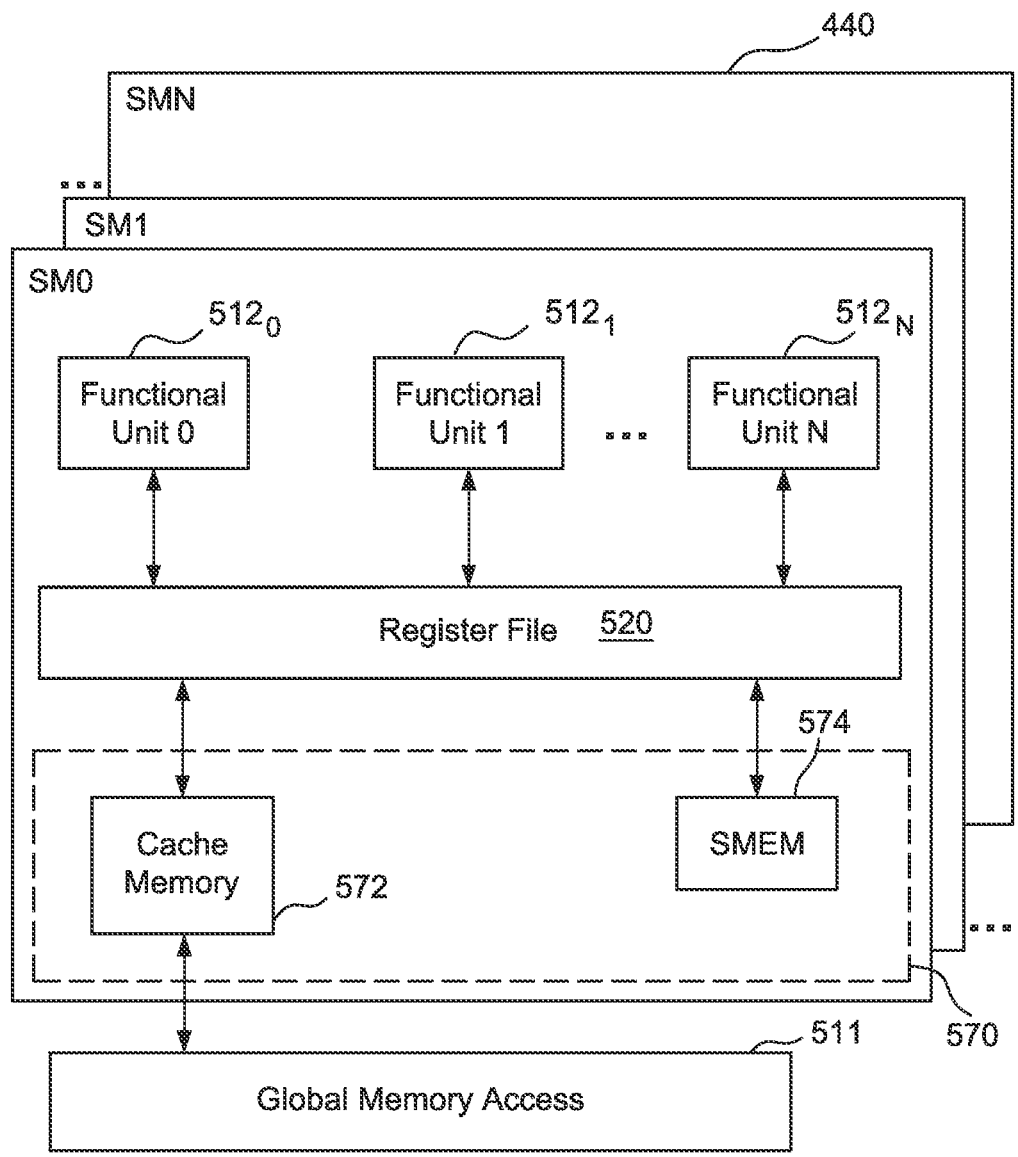
FIGS. 1A-1B illustrate an example non-limiting parallel processing architecture in which data is routed into shared memory via a cache and registers.

The example non-limiting technology herein provides solutions for effective data access bandwidth to feed streaming multiprocessor core math units at their "speed of light" rate. Within the streaming multiprocessor (SM) there is a need to reduce Memory Input Output Interface (MIO) bandwidth and reduce register pressure for moving data operands to allow 2× increased math throughput over previous architectures.

Example non-limiting embodiments provide techniques of block data transfer as a way of reducing data transfer and memory access overheads to significantly reduce multiprocessor (e.g., SM-level) activity and energy consumption. In a typical compute program, the threads co-cooperatively load data from global memory, then store it in shared memory, so that it can be subsequently accessed multiple times and processed. Example embodiments provide a new instruction that directs the data loaded from global memory to be stored directly into shared memory. This eliminates moving data through SM registers and minimizes the data movement though MIO. Example non-limiting embodiments provide the executing application to selectively direct the requested data from the global memory into the shared memory (1) bypassing the registers and the L1 cache, (2) via the L1 cache bypassing the registers, or (3) via the L1 cache and the registers. In example non-limiting embodiments, shared memory is software managed and L1 cache memory is hardware managed.

One aspect of the example non-limiting technology herein thus provides an instruction set architecture (ISA) providing (at least) three different types of load-from-memory and store-to-memory instructions or instruction sequences:

(a) a typical traditional load instruction in which data is retrieved from main or global memory and written into a cache line of an on-chip cache memory (which may be managed by hardware), then written from the cache memory into one or more registers of a processing core (such data once residing in the one or more registers of the processing core may then be stored from the register(s) into on-chip shared memory using a traditional store to memory instruction); or a first type or species of bypass load from memory instruction that bypasses the processor core register(s), i.e., the data written into the cache line is copied into shared memory without first being written into the processing core register(s); or a second type or species of bypass load instruction that bypasses both the processor core register(s) and the cache memory, i.e., the data retrieved from the main or global memory is written directly into the shared memory without first being stored in the processor core registers or the cache memory.

The developer may select different ones of these instructions to perform a load from memory operation depending on need and performance requirements.

For example, in many cases it will be important to maintain memory coherency using the hardware support of the on-chip cache, and the developer will want to explicitly control the storing of individual values into particular shared memory locations using application-defined addresses. In those instances, the developer will cause the traditional load and store instructions to be executed to provide the traditional memory load path of GLOBAL>CACHE>REGISTER>SHARED.

On the other hand, there will be cases where the developer wants the benefits of a hardware-maintained cache memory but, the loaded data is not needed by the application as value loaded by a specific thread. It may only be needed as collectively loaded and explicitly synchronized data in shared memory. In such cases, the developer may cause the first type or species of bypass load instruction to be executed to provide the memory load path GLOBAL>CACHE>SHARED.

In still other instances, there will be cases in which the developer wants to load data into shared memory as efficiently as possible and wants to tie up a minimum of other resources doing so, in which case the developer may cause the second type or species of bypass load instruction to be executed, providing the memory load path GLOBAL>SHARED.

The typical traditional load instruction in which data is retrieved from main or global memory and written into a cache line of an on-chip cache memory is implemented by two separate instructions. A load from global memory instruction followed by a separate store to shared memory instruction. The load from global memory instructions loads data from global memory into the data registers of the requesting thread. The store to shared memory stores data in the registers into the shared memory.

Example non-limiting embodiments provide a fused load and store instruction (LDGSTS) which can load data from the global memory (LDG) and store the data into the shared memory (STS) bypasses the processor core register. The fused load and store instruction (LDGSTS) can load data from the global memory and store the data into the shared memory with options to bypass the processor core register(s) or bypass both the processor core register(s) and the cache memory. The first type or species of the load/store instruction is LDGSTS.ACCESS, which bypasses the processor core register(s). The second type or species of the load/store instruction is LDGSTS.BYPASS, which bypasses both the processor core register(s) and the cache memory. The LDGSTS.ACCESS and LDGSTS.BYPASS instructions may include two address operands, a destination shared memory address and a source global address. The instruction code for the traditional load and store, LDGSTS.ACCESS, and/or LDGSTS.BYPASS may be loaded into an instruction register and an instruction decoder may convert the instructions into settings for the hardware. Based on type or species of the issued instruction, the load data from the global memory and store into the shared memory instruction may control the hardware to bypass the processor core register(s) and/or the cache memory.

In some example non-limiting embodiments, the decision of which of the different types or species of load from memory instructions to use can be made by an optimizing compiler, based e.g., on switches the developer includes in the source code, a trace of what happens to the data (e.g., is it ever changed and written back to main or global memory), and/or whether cores/threads/warps other than the core/thread/warp that executes the load from memory instruction later accesses the data, and/or other optimization factors.

In some examples, the decision of which of the different types or species of load from memory instructions to use can be dynamically made at runtime by evaluating conditions in the source code by the developer. For example, the decision may be made through the use of memory descriptor included as an instruction parameter. This may be a hint to transform LDGSTS.ACCESS into LDGSTS.BYPASS if possible. For example, the LDGSTS.ACCESS may be overridden in variants with a memory descriptor. If the memory descriptor has llInvDontAllocate set and .sz is specified as 128, then the global memory access is treated as though .BYPASS were specified. There may be instruction properties, such as operand size supported for LDGSTS.ACCESS but are not supported for LDGSTS.BYPASS on some embodiments that prevent this transform.

It will be understood by one skilled in the art that the same execution thread can use any or all of these different memory load instructions depending on context. Thus, the same execution thread can load some values from global memory into shared memory using the traditional load instruction, it can load other values from global memory into shared memory using the first type of bypass load instruction, and it can load still other values from global memory into shared memory using the second type of bypass load instruction.

Example non-limiting embodiments provide one or more of:
   Multithread copy with asynchronous DMA-like behavior. The copy may be directed to access through L1 cache, or to bypass it.
   Detection and encoding of fill patterns. The data is "swizzled" as it is stored into shared memory to allow subsequent conflict-free access. Rather than stage the data through SM registers and swizzle it when stored into shared memory, example embodiments detect the swizzle pattern generated among cooperative threads and encode it for use when the data is filled.
   Byte level zeroing of out of bounds fill results.
   Programming models that among other things, allow for efficient software pipelining of operations.

The example non-limiting technology herein provides block data transfer techniques reducing data transfer and memory access overheads to significantly reduce streaming multiprocessor SM-level activity and energy consumption. In a typical compute program, the threads co-cooperatively load data from global memory, then store it in the shared memory, so that it can be subsequently accessed multiple times and processed.

FIGS. 1A-3B illustrates an example non-limiting parallel processing architecture showing software controlled transfer of data from the global memory 511 to shared memory 574 accessible by a plurality of functional units $512_0$-$512_N$. The parallel processing architecture includes a plurality of SMs 440 (SM0-SMN) with access to the global memory 511 that is external to the SMs 440. The global memory 511 may include a hierarchical cache memory (e.g., Level 2 cache and/or Level 3 cache) and/or DRAM memory. In some examples, the global memory 511 may include memory management unit (MMU) 490, X-Bar 370, Memory Partition Uni 380, and/or memory 304 described with reference to FIGS. 8-10C.

Each of the SMs 440 includes multiple cores, such as functional units $512_0$-$512_N$, configured to process a plurality of threads in parallel. A thread (e.g., a thread of execution) is an instantiation of a set of instructions configured to be executed by the functional units $512_0$-$512_N$ on a particular data set. Threads of a thread block can be executed concurrently and multiple thread blocks can be executed concurrently. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of cores. Unlike a SIMD execution regime, where all cores typically execute identical instructions, SIMT execution allows different threads to more readily follow divergent execution paths through a given program. Persons of ordinary skill in the art will understand that a SIMD processing regime represents a functional subset of a SIMT processing regime.

Each of the functional units $512_0$-$512_N$ is coupled to a cache memory 572, shared memory 574, and a register file 520 via an interconnect network, for example, a hierarchical cross-bar with one or more read and/or write crossbars. The cache memory 572, which may be a Level 1 (L1) cache, and shared memory 574 provide low-latency on-chip memory near each of the functional units $512_0$-$512_N$. The register file 520 may include data registers assignable by software to a different functional unit of the plurality of functional units $512_0$-$512_N$ and/or different warps being executed by the SM 440. The register file 520 provides temporary storage for functional units $512_0$-$512_N$.

The parallel processing architecture can support multiple address spaces including local, shared and global to support data visibility for the threads. Additional read only address spaces including constants and textures may be supported. Each thread has its own per thread local or private memory which can be controlled by allocation of registers (see e.g., U.S. Pat. Nos. 8,555,035 and 7,634,621 which are hereby incorporated herein by reference as if expressly set forth).

Each thread in the same thread block or different thread blocks can access the global memory 511 using the hierarchical cache memories. Each thread in the same thread block can access an assigned portion of the shared memory 574, which can be considered per-block shared memory. Each executing block of threads may have an allocated portion of the shared memory 574. The shared memory 574 is a software managed cache used to load data from global memory so that the number of off-chip memory accesses by the executing threads is reduced. The software explicitly allocates and accesses the shared memory 574. Threads in a thread block are synchronized (e.g., after cooperatively loading data from global memory into shared memory) to avoid critical resource use conflicts.

When multiple threads in a block are expected to use the same data from global memory 511, shared memory 574 can be used to store this data so that the number of requests to global memory 511 is reduced. Shared memory 14 can also be used to avoid uncoalesced memory accesses by loading and storing data in a coalesced pattern from global memory 11 and then reordering it in shared memory 14 to improve access to the data by the threads.

In some embodiments, a unified cache system 570 may include a data memory configurable as both a shared memory 574 and a local cache memory 572. The unified cache system may be provided in the same on-chip memory (e.g., SRAM) used for both L1 cache and shared memory, and include a mechanism to allocate how much of the unified memory is dedicated to L1 cache versus shared memory for each kernel call. Combining the L1 data cache with the shared memory into a unified memory reduces latency and provides higher bandwidth. In some examples, the unified cache system may also include a dynamically configurable register file (e.g., register file 520). For more information about unified cache system and how it can be configured, see for example the following references that are incorporated herein by reference as if expressly set forth: U.S. Patent Application Publication No. 2018/0322078; and CUDA C Programming Guide, PG-02829-001_v10.1|May 2019 https://docs.nvidia.com/cuda/cuda-c-programming-guide/index.html#shared-memory.

When software running on one or more of the functional units $512_0$-$512_N$ needs data stored in the global memory 511, the software initiates a thread with a "load" from memory command. The load from memory command may load data from the global memory 511 and store the data in shared memory 574, making it visible to all threads (e.g., all threads in a block). Once the data is stored in the shared memory, the threads can access the data multiple times.

Figure 1B:
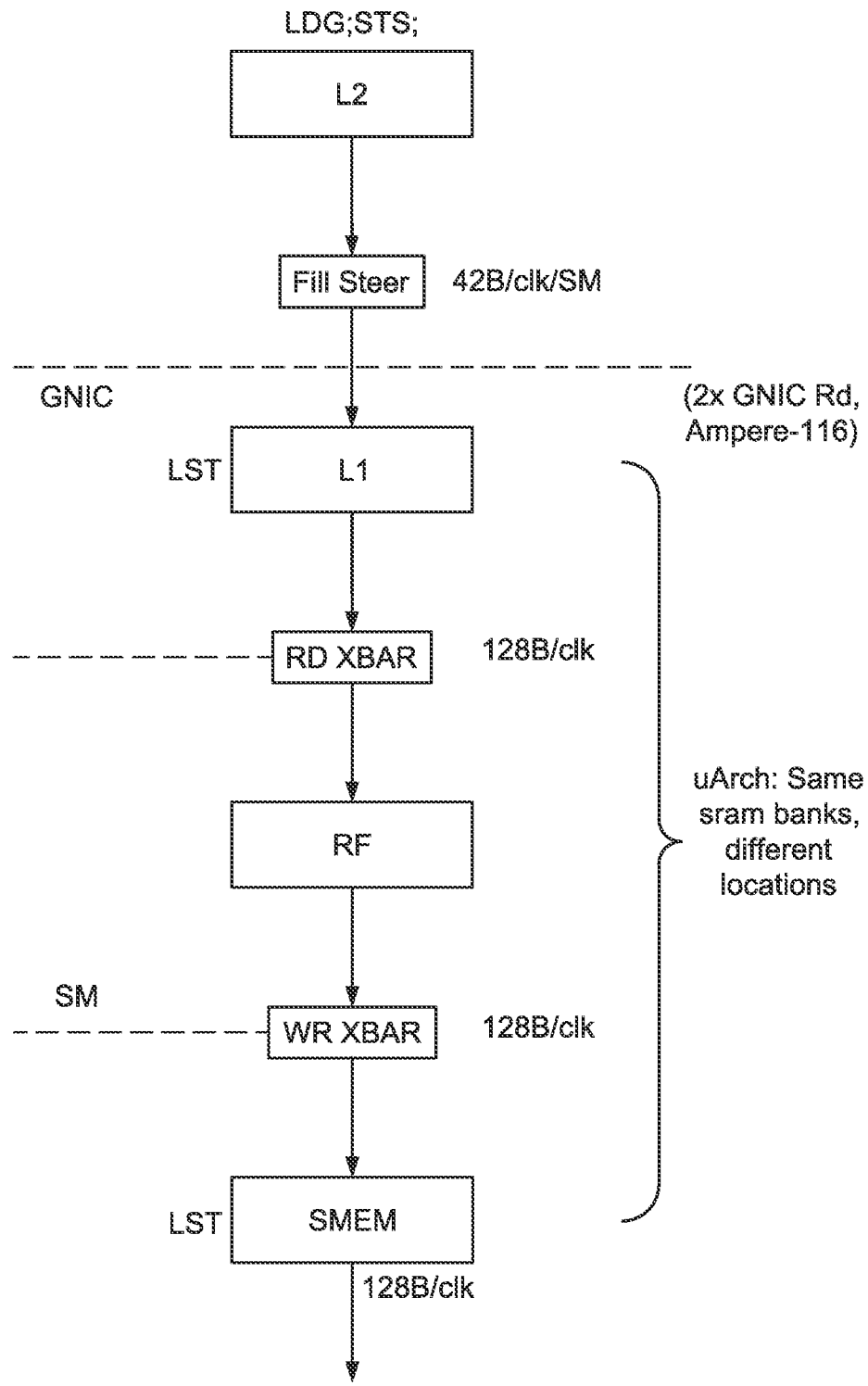

FIGS. 1A and 1B illustrate conventional staging of data delivered from global memory (e.g., L2) to shared memory 574 of the SM through a hierarchical cross-bar. Each SM 440 can have one or more such read ports, each with 32-byte fill bandwidth connected to it.

The data is loaded using a Global Memory Load (LDG) operation followed by a Store to Shared Memory (STS) operation. In some examples, the L1 cache of the SM has a unified physical data ram for both tagged data and shared memory. The organization of this data ram may have, for example, 32 banks of 32 bits each. However, even with unified memory, conventional approach has been to stage the data through multiple memory locations (i.e., L1 cache and registers) before it is stored in the shared memory.

In prior GPUs, the incoming read port data (32-byte sector fills) is first written back into the cache memory 572 (e.g., L1 cache). The L1 cache-line may be 128 bytes, with 4 32-byte sectors. Incoming fill sector is steered to one of the 4 cache line sectors. When all the sectors associated with a load operation are received, the load operation completes, and the data is read back from the filled sectors in L1, aligned to requesting thread through the read crossbar and then written back to destination registers. Subsequently an STS operation is issued, where the data is read from the SM register file, and then written back to shared memory data banks after traversing through write crossbar to align it to shared memory address. This entire sequence, thus, has 2 wide RAM read and writes, and 2 traversals through a local crossbar.

As shown in FIGS. 1A and 1B, both the cache memory 572 and the register file 520 are utilized during the data transfer. This approach can be detrimental to performance for a number of reasons. When a load from global memory 511 operation is issued, registers are assigned to the thread for representing the results. Because the load operation may request data from a hundred different locations and latency should be overlapped as much as possible, a hundred different registers will be tied up. In addition, these registers are tied up as long as the load is outstanding, which could be thousands of cycles. While fewer registers can be allocated, allocating fewer registers for such load operations will serialize the memory read and load operations, increasing the transfer time.

Exemplary code loading data into shared memory via Global Memory Load (LDG) followed by Store to Shared Memory (STS) instruction may include:

```
// co-operative load
Rx <- LDG [ ];
...
Rz <- LDG [ ];
//scoreboard dependency
// followed by shared store
STS [ ], Rx;
...
```

```
STS [ ], Rz;
<barrier>
// wait at the barrier
LDS [ ];
...
FFMA;
```

As shown in the above code, the LDG instruction loads data from global memory into registers, and the STS instructions stores the data from the registers into the shared memory. Following the LDG and STS instructions, Load within Shared Memory Window (LDS) instruction is executed to load data into registers for performing a fused multiply-add operation FFMA. Matrix multiplication is a key computation within many scientific applications, particularly those in deep learning. For more information about efficient matrix multiplication on a GPU, see for example CUTLASS: Fast Linear Algebra in CUDA C++, Dec. 5, 2017 (Updated May 21, 2018), https://devblogs.nvidia.com/cutlass-linear-algebra-cuda/, which is incorporated herein by reference. The present technology is not limited to the FFMA instruction, but may be implemented with other instructions that use data loaded into the shared memory.

To optimize loading data into shared memory, example non-limiting embodiments eliminate the need to stage data through SM's register file. In example non-limiting embodiments, this is implemented as a single LDGSTS.ACCESS instruction, with two address operands, a destination shared memory address and a source global address.

Figure 2A:
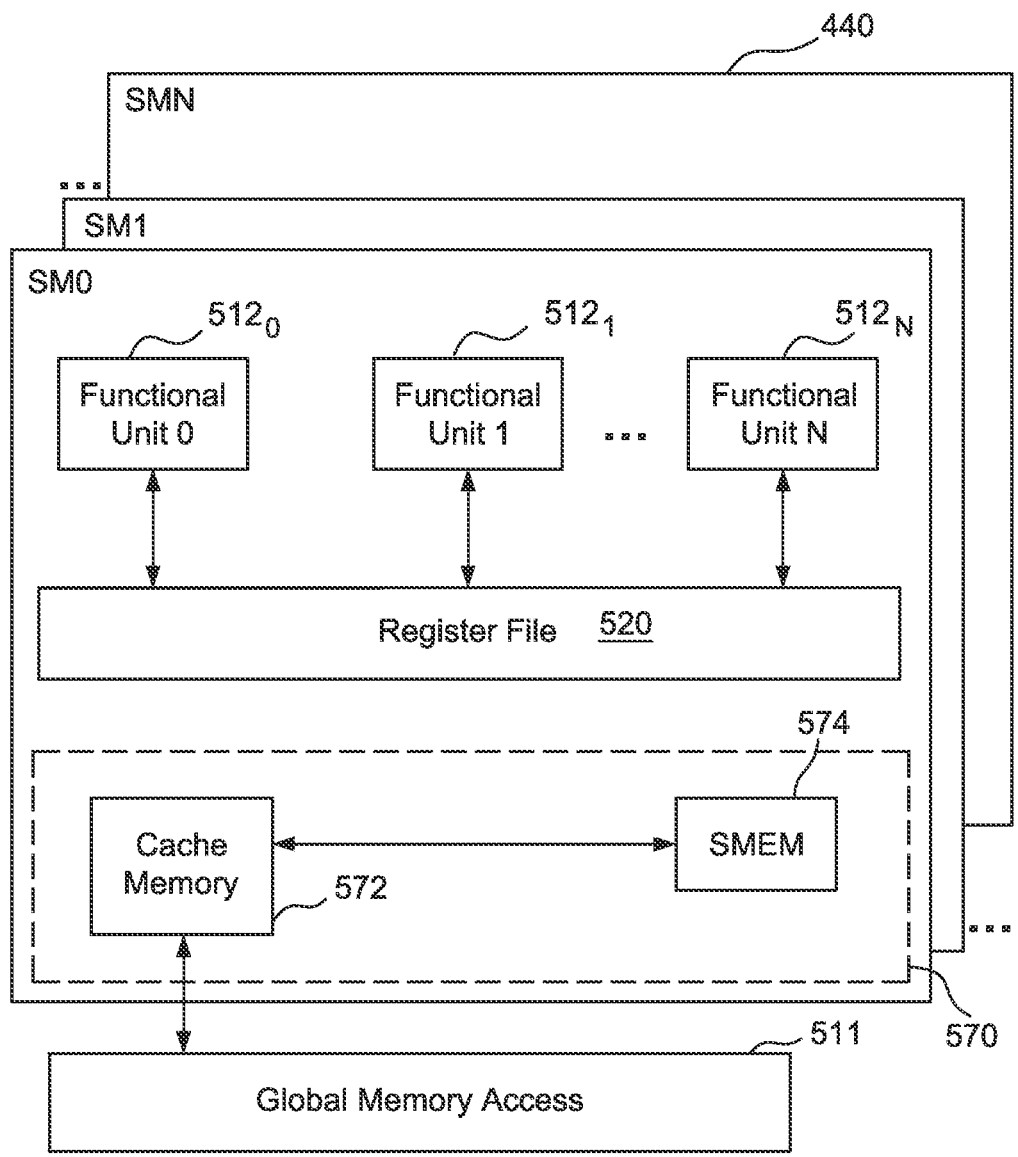
FIGS. 2A-2B illustrates an example non-limiting parallel processing architecture in which data is written into shared memory, bypassing registers.
Figure 2B:
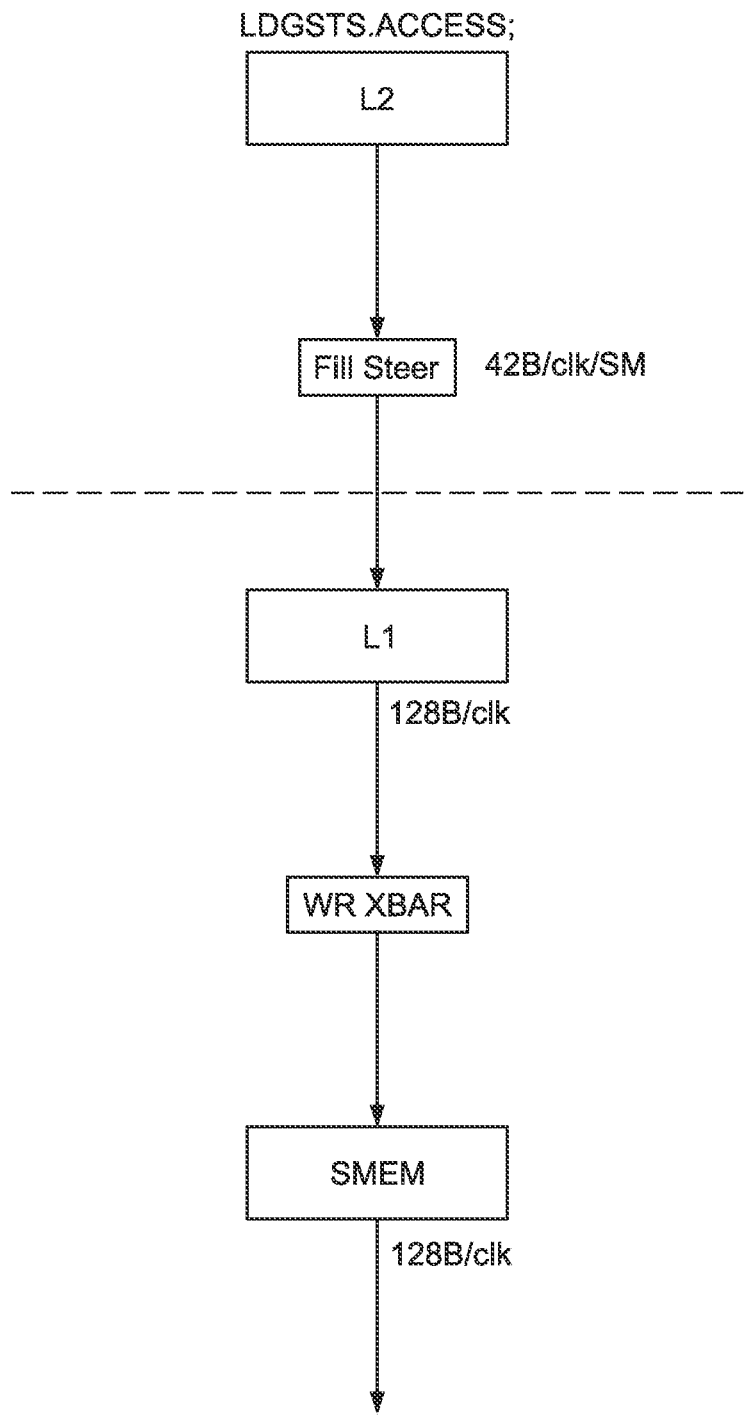

FIGS. 2A and 2B illustrate loading data into shared memory 574 without first loading the data into registers 520 during the data transfer. The data is transferred using a fused instruction loading from the global memory 511 and storing the data into the shared memory 574 via the cache memory 572. In this embodiment, a normal load is performed with global addresses and incoming fill data sectors are written back to the data cache. Then data is pulled from cached data rows, aligned through the read data crossbar and written back to shared memory destination location. The write crossbar, which normally aligns store data, may be used to alight the write address. From energy efficiency point of view, this instruction eliminates a register file read and write energy compared to separate LDG and STS instructions. Also, from a performance point of view, this instruction reduces the register pressure by not having to reserve registers for long latency load returns. Because the registers are no longer needed to hold transient load values, they can be used for other tasks. The only registers needed for the fused memory load and store operation may include addresses for the SM arithmetic.

As will be discussed in more detail below, example non-limiting embodiments allow for completion of the instruction to be tracked as an asynchronous copy/DMA independent of other memory operations.

Exemplary code using a fused LDGSTS via L1 cache while bypassing the registers may include:

```
// co-operative load
LDGSTS.ACCESS [ ] [ ];
...
LDGSTS.ACCESS [ ] [ ];
//scoreboard dependency
// followed by barrier
<barrier>
// wait at the barrier
LDS [ ];
...
FFMA;
```

Figure 3A:
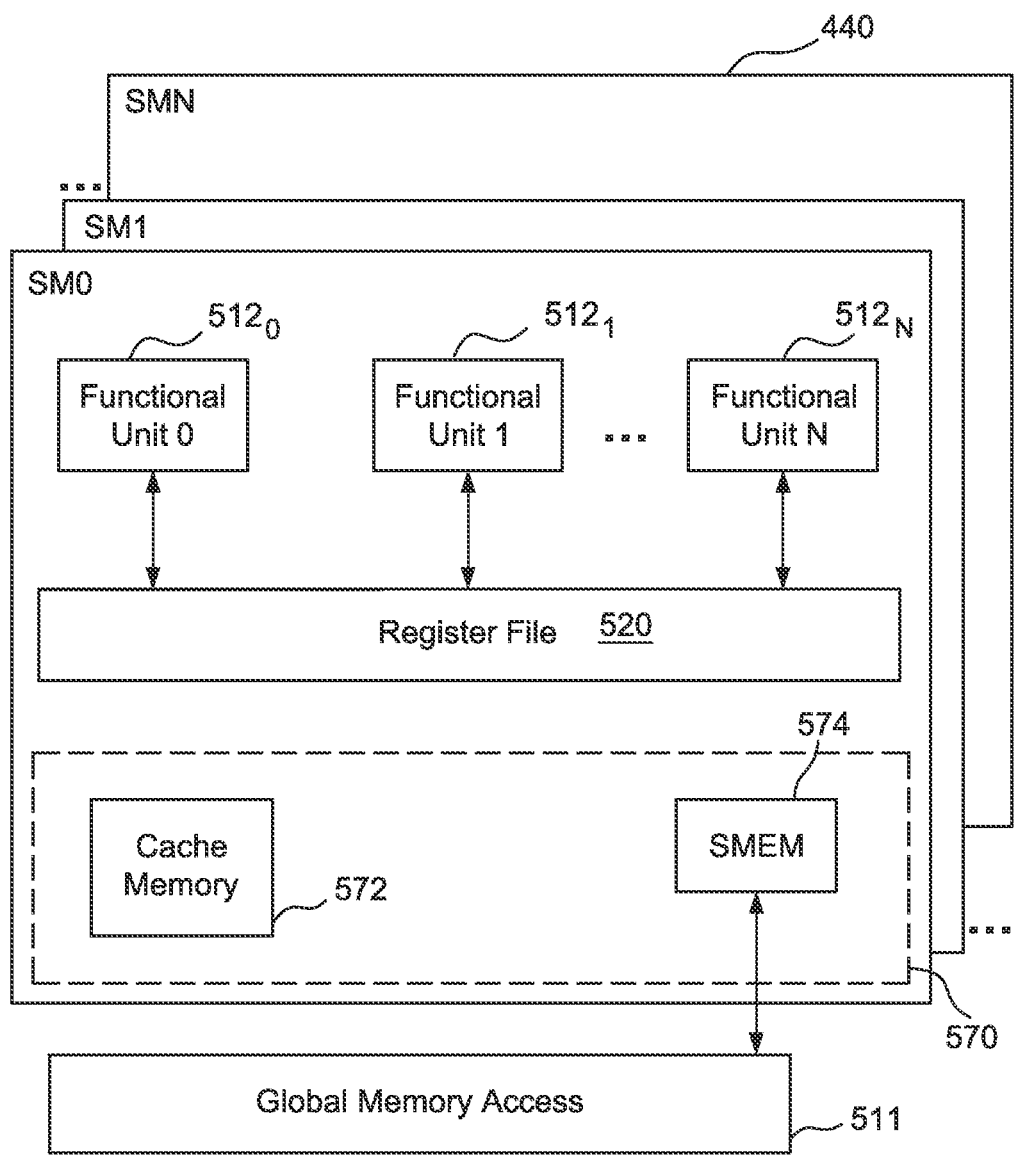
FIGS. 3A-3B illustrates an example non-limiting parallel processing architecture in which data is written into shared memory, bypassing registers and a cache.
Figure 3B:
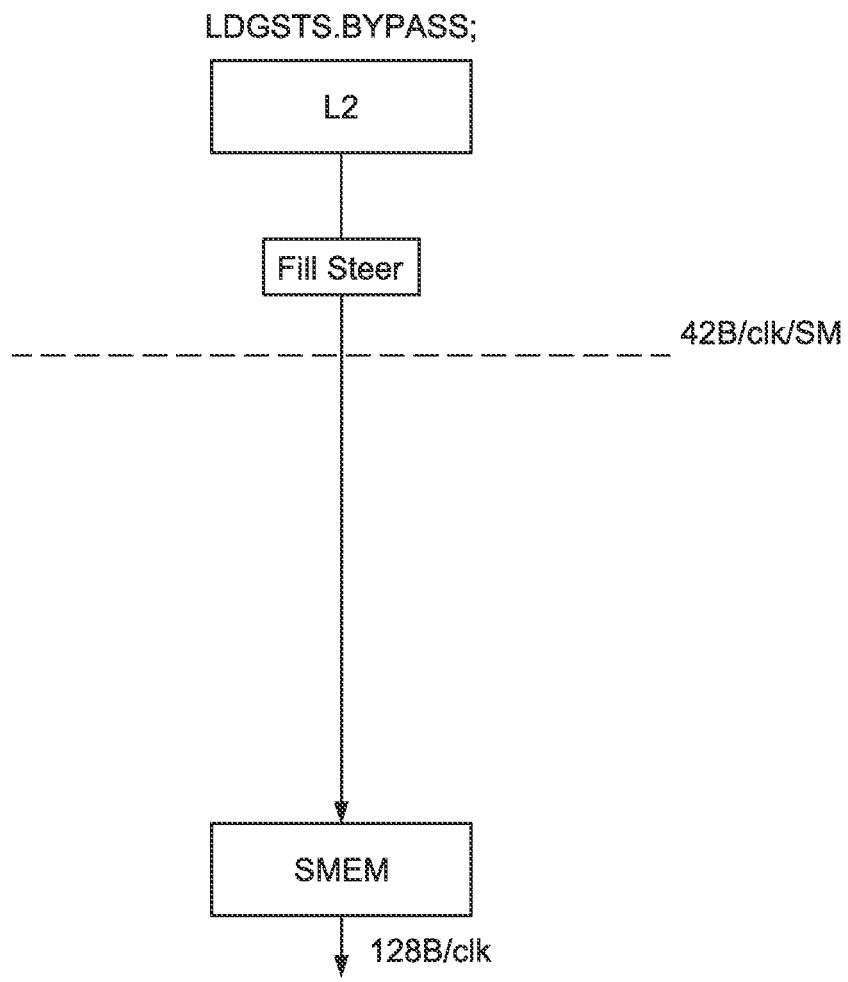

To further optimize loading data into shared memory, example non-limiting embodiments eliminate the need to stage data through SM's register file and the L1 cache. FIGS. 3A and 3B illustrate loading data into shared memory 574 without first loading the data into the register file 520 and cache memory 572 during the data transfer. This instruction is provided with a single LDGST.BYPASS instruction.

In this example non-limiting embodiment, further energy reduction is possible by writing the incoming fill data back directly at the final shared memory destination. This can additionally eliminate an L1 data ram read and a write energy over embodiment shown in FIGS. 2A and 2B. From a performance point of view, this example embodiment also translates to reduced demand of shared memory crossbar and L1DATA bandwidth. In dense math kernels like GEneral Matrix-to-matrix Multiply (GEMM), with the warp wide Matrix Multiply-Accumulate (MMA) instructions, L1DATA can become a bottleneck. Implementing a data path without staging the data in the registers and L1, may utilize a full-blown data crossbar from read port (as an artifact of the exemplary embodiment the read port cannot be stalled). In FIG. 2A, the interface between global memory access 511 and cache memory 572 comprises the read port. In FIG. 3B, the interface between Fill Steer and L1 comprises the read port.

Exemplary code using a fused LDGSTS.BYPASS instruction bypassing the L1 cache and registers can include:

```
// co-operative load
LDGSTS.BYPASS [ ] [ ];
...
LDGSTS.BYPASS [ ] [ ];
//scoreboard dependency
// followed by barrier
<barrier>
// wait at the barrier
LDS [ ];
...
FFMA;
```

In some examples, a processing system, such as a GPU, may include decode logic for receiving and decoding the instructions. The decoded instructions may be used to control hardware loading and storing data based on the instructions. The GPU may include decoding a fused load/store instruction format specifying whether the GPU shall (a) bypass the processor register or (a) bypass both the processor register and a cache memory. Based on the decoding, the requested data may be loaded and stored by the hardware. In one example, in response to the decoding, the GPU may retrieve a data word from a first memory (e.g., global memory) and store the retrieved data word into a second memory (e.g., shared memory) without first storing the retrieved data in the processor register or without first storing the retrieved data in the processor register and the cache memory, as selected by the decoded fused load/store instruction format specification. The second memory may be shared by a plurality of thread (e.g., plurality of thread in a thread block) and/or disposed in a common on-chip physical memory address space with the cache memory.

The fused load/store instruction format may include a source address (e.g., global memory address), a destination address (e.g., address in second memory), and transfer path of the data. In one example, the fused load/store instruction may include (i) a source word address, (ii) a destination word address, and (iii) at least one bit specifying of whether the GPU shall (a) bypass a processor register or (b) bypass both the processor register and a cache memory to retrieve a data word from the source word address and store the retrieved data word into the destination word address, and the decoding comprises decoding said at least one bit.

Tagged and Shared Memory Control System

Figure 4:
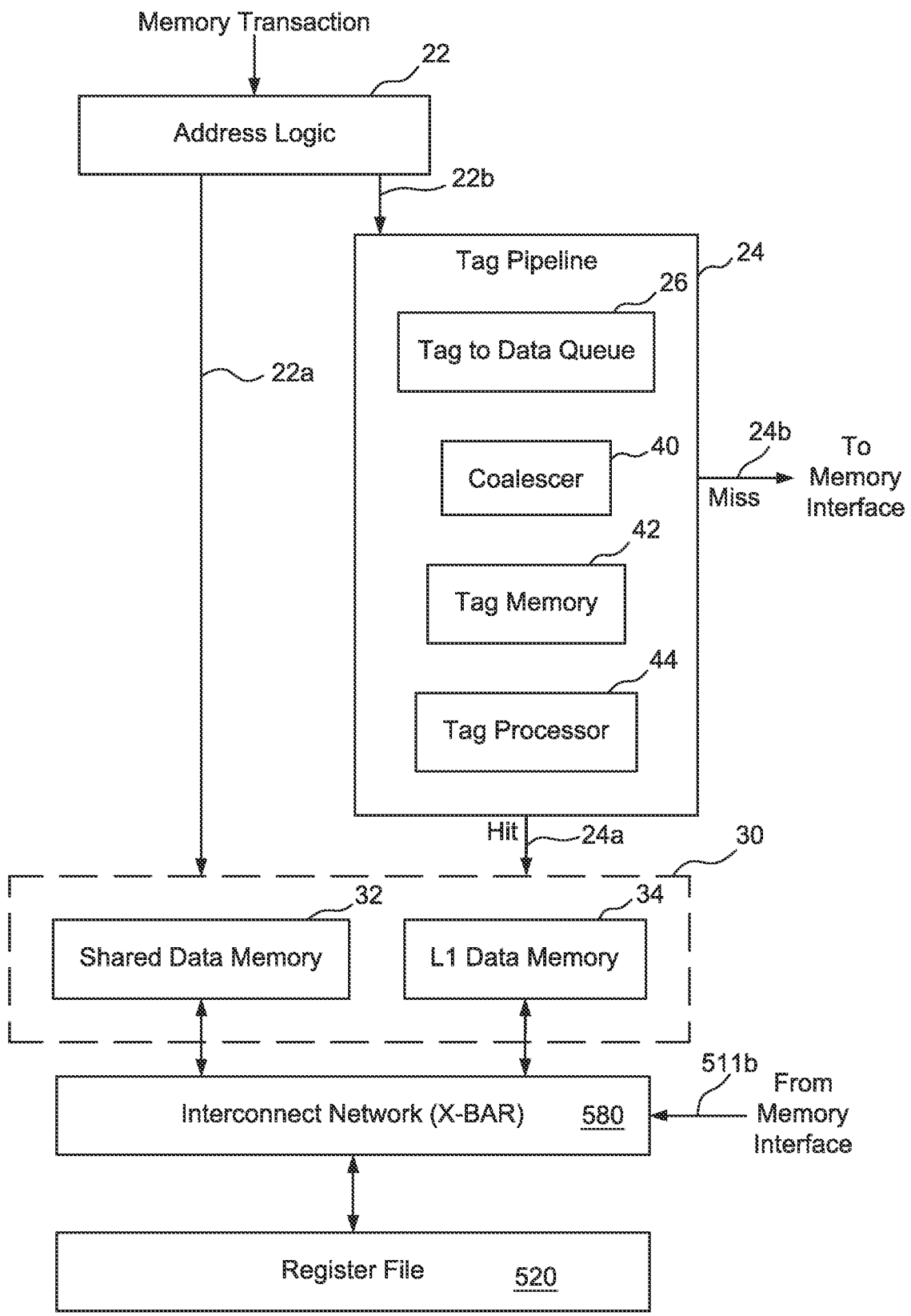
FIG. 4 shows an example non-limiting block diagram of a memory control system.

FIG. 4 shows an example block diagram of a memory control system that may be directed by instructions disclosed in this application (e.g., load, store, and/or fused load and store instructions). Examples of the present technology are not limited to the specific memory control system shown in FIG. 4 but can be applied to other memory control systems. The memory control system shown in FIG. 4 includes address logic 22, a tag pipeline 24, a tag to data queue 26, data memory storage 30, an interconnect network 580, and a register file 520. One or more operations described with reference to FIG. 4 can be implemented by one or more load/store units (LSUs) 554 (shown in FIG. 10A). The data memory storage 30 may include shared data memory storage 32 and L1 data memory storage 34, provided in a configurable unified cache architecture.

The address logic 22 is configured to receive memory transactions from executing threads, generate addresses for servicing those transactions, and route the memory transaction based on the type of memory transaction. In some examples, the address logic 22 may include an address generation unit (AGU). The AGU may be configured to calculate global addresses for accessing the global memory and local addresses for accessing shared memory.

The memory transactions received by the address logic 22 may include load transactions, store transaction, and fused load/store transactions. The load transactions may include load from shared memory and load from global space. The data returned in response to the load transactions may be provided to the register files associated with requesting threads.

The store transactions may include store to shared memory and store to global memory. Data in the registers associated with specific functional units may be stored in the shared memory and/or the global memory.

Depending on the memory instruction and the type of system architecture, the data for the load and/or store instruction may take particular paths. As an example, when the address logic 22 receives an instruction to load data from shared memory into registers associated with a specific thread, the address logic 22 calculates the shared memory address and routes the instruction directly along data path 22a to the shared data memory 32, providing a low latency memory transaction. Unlike external memory which can be hundreds or thousands of cycles away from the shared memory, shared memory 32 can be one cycle away from the requesting threads. The requested data from the shared data memory 32 is provided to the register file 520 associated with the requesting thread via the interconnect network 580.

As discussed above, when data is loaded into shared memory using a conventional load from global memory instruction, the data travels from the global memory into L1 cache, from L1 cache into the registers, and from the registers into the shared memory. The instructions disclosed in this application provide an option for load to shared memory instruction to bypass the registers and/or the L1 cache as the requested data is stored into the shared memory from global memory.

When the address logic 22 receives an instruction to load memory into shared memory while bypassing the registers (e.g., LDGSTS.ACCESS instruction), the instruction is broken up into two separate sub-instructions through an address generation unit (AGU) calculating a source global address and a destination shared memory address. The source global address is used in the load operation and the destination shared memory address is used in the store to shared memory operation. The LDG sub instruction can be treated as normal load by a tag stage and does a 32 addresses to four independent tags request coalescing. The STS sub instruction can be treated as a dummy instruction, just to pass through shared memory addresses to the pipeline.

The address logic 22 routes the load instruction along data path 22b to the tag pipeline 24. The tag pipeline 24 determines, based on tag information, whether the requested data is available in the L1 data memory 34. When a hit occurs because the requested data is available in the L1 data memory 34, the tag pipeline 24 routes the memory transaction to the L1 data memory 34 via data path 24a. The data is pulled from cached data rows of the L1 data memory 34, aligned through the interconnect network 580 (e.g., a write crossbar), and written back to the destination shared memory address of the shared data memory 32. This data path is different from a conventional load instruction in which requested data in the L1 data memory 34 is first stored into the register file 520 via the interconnect network 580, and then moved from the register file 520 to the shared data memory 32. In case of the hit, the store path (e.g., including a side collector) is used to synthesize an atomic like read/modify/write operation that reads from tagged lines and stores to shared memory lines in data caches.

When a miss occurs because the requested data is not available in the L1 data memory 34, the tag pipeline 24 allocates a tag and requests miss data from a global memory interface via data path 24b. The global memory interface may include hardware (e.g., direct memory access (DMA) I/O) for retrieving data from other caches and main memory. The memory transaction is also pushed to the queue 26, which may include a tag-to-data (t2d) first-in first-out (FIFO). The memory transaction is stalled in the queue 26 until the miss data is returned to the L1 data memory 34 and the associated memory transaction reaches the top of the queue 26.

The tag pipeline 24 may include a coalescer 40, tag memory 42 and tag processor 44 for servicing the memory transactions received from the address logic 22. The coalescer 40 may re-order and/or merge individual write requests (e.g., sector requests) into a big cache-line request.

The tag processor 44 determines whether a tag for a give memory transaction is present in the tag memory 42. If the tag processor 44 determines that the tag is present and the data corresponding to the tag is present in the L1 data memory 34, a cache hit occurs and the memory transaction is routed to the L1 data memory 34. If the tag processor 44 determines that the tag is not present, the tag processor 44 allocates a tag in the tag memory 42 and associated location within the L1 data memory 34 for data when it is returned from the global memory.

When the address logic 22 receives an instruction (e.g., LDGSTS.BYPASS instruction) to load memory into shared memory while bypassing the registers and the L1 cache, the instruction is broken up into two separate sub-instructions through the AGU calculating a source global address and a destination shared memory address. The source global address is used in the load operation and the destination shared memory address is used to store to shared memory operation. Representations of the global address and the shared memory address in the instruction can be specified in registers of the requesting thread.

The address logic 22 routes the load instruction along data path 22b to the tag pipeline 24. The tag pipeline 24 determines, based on tag information, whether the requested data is stored in the L1 data memory 34. When a hit occurs because the requested data is available in the L1 data memory 34, the tag pipeline 24 routes the memory transaction to the L1 data memory 34 via data path 24a. The data is pulled from cached data rows of the L1 data memory 34, aligned through the interconnect network 580 (e.g., write crossbar), written back to the destination shared memory address of the shared data memory 32, and the tag for the written data is invalidated. The tag can be invalidated because the data is now stored in the shared memory and the application is not expected to request the same data from global memory in the short term.

When a miss occurs, the tag pipeline 24 allocates a tag and requests miss data from the global memory interface via data path 24b. The memory transaction is also pushed to the queue 26. The memory transaction is stalled until the miss data is returned. When the data is returned via data path 511b, the fill data is written back directly to the final shared memory destination in the shared data memory 32, without storing the data in the L1 data memory 34, and the tag for the written data is invalidated. The data is written directly to the shared data memory 32 via the interconnect network 580 from a read port (see read port discussed with reference to FIGS. 2A and 2B).

Direct global to shared memory path (not passing through cache or register) may not maintain line-level coherence, leaving a stale value in cache, which may be inconsistent with the value that is visible in the shared memory in some implementations. To avoid the inconsistency, example embodiments described above provide for an implementation in which the system snoops and invalidates the L1 line.

In some embodiments, the interconnect network 580 may include more than one crossbar. For example, in one embodiment, the interconnect network 580 includes a crossbar for general loads and stores and a separate crossbar for writing data received from the memory interface via data path 511b into share data memory 32. In this embodiment, the separate crossbar can be used since the crossbar functionally needed is this path is simpler than what is needed for general loads and stores. The data path in this example may include data path 511b from memory interface through a separate fill crossbar to the contents of data memory storage 30. This allows to simultaneously fill from memory while reading from shared data memory 32 or L1 data memory 34.

Loading data from shared memory provides flexibility in the granularity of returned data. For example, if 32 words are read from shared memory, the 32 words can be received from different lines if the requested words are stored across different banks of the shared memory. In L1, the 32 words would come from the same cache line. Even though the physical structure of the L1 is similar to the shared memory, it is not possible to get this level of granularity with L1 because L1 is limited on how many tags can be used (e.g., four tags). The L1 accesses may be restricted up to the number of different non-conflicting lines as the number of tag banks. In the example of L1 using four tag banks, up to four cache lines could be accessed.

Figure 5:
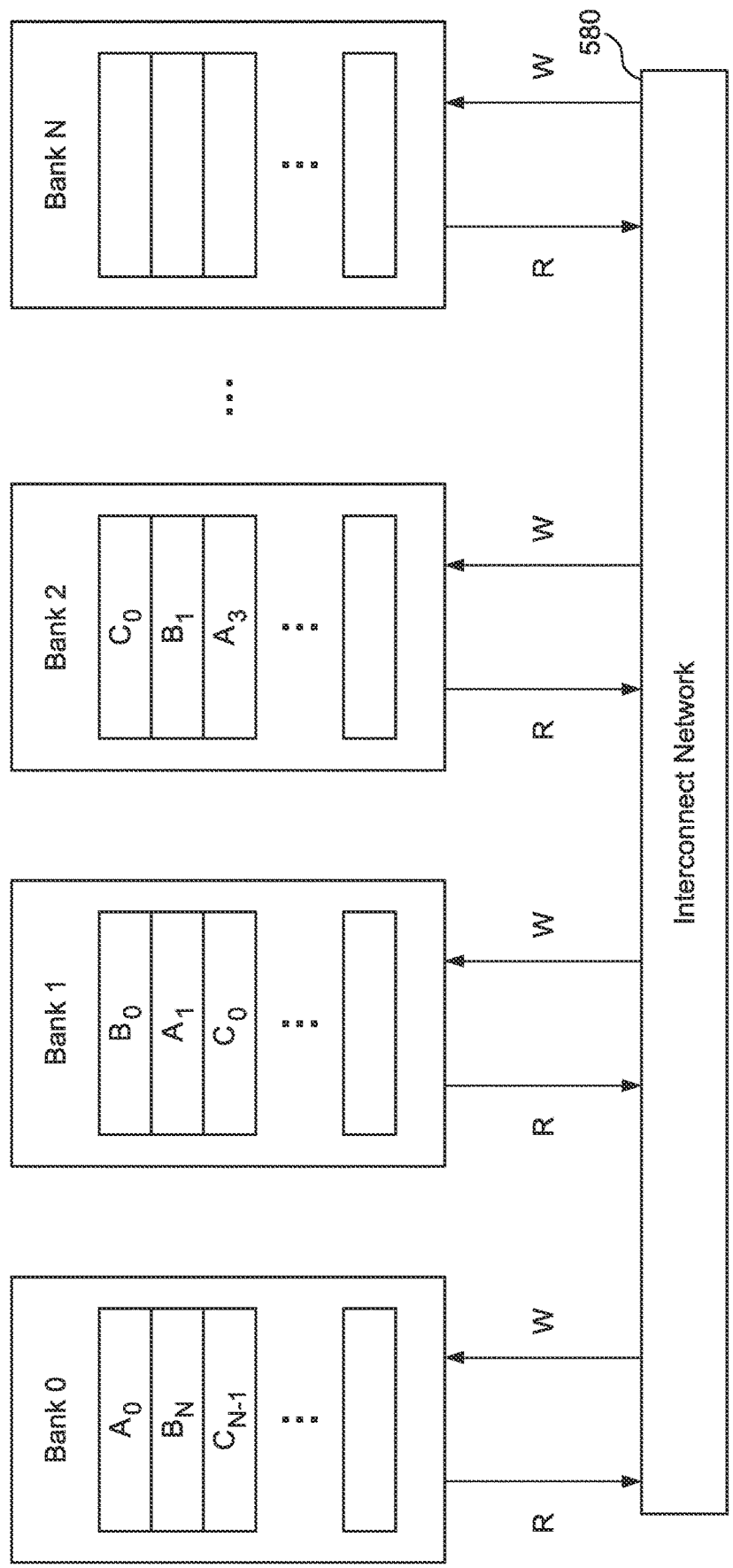
FIG. 5 shows an example of shared memory including a plurality of banks coupled to an interconnect circuit.

To increase bandwidth in shared data memory 32, the on-chip memory is organized into multiple banks. FIG. 5 shows an example of shared memory including a plurality of banks coupled to an interconnect network 580. Because the shared memory is close to the processing cores, the shared memory provides higher bandwidth and lower latency than off-chip memory. However, how the data is distributed across the plurality of shared memory banks can affect the bandwidth.

As shown in FIG. 5, the shared memory is divided into a plurality of banks (e.g., 32 banks with 32 or 64 bits per clock cycle bandwidth), each including a read port and a write port from which writes and reads can be processed simultaneously in multiple banks. Memory requests made of N addresses falling into N distinct banks, can be processed simultaneously. For example, if read request is made for data at A0, A1, A3, then the data from Bank 0, Bank 1, and Bank 2 can be read simultaneously by the interconnect network 580 via the respective read ports. If multiple addresses of a memory request fall in the same memory bank, the request will serialize the individual address requests. For example, if the read request is made for data at B0, A1 and C0, then there is a bank conflict and the read request for B0, A1, and C0 will be serialized into three reads.

Figure 6:
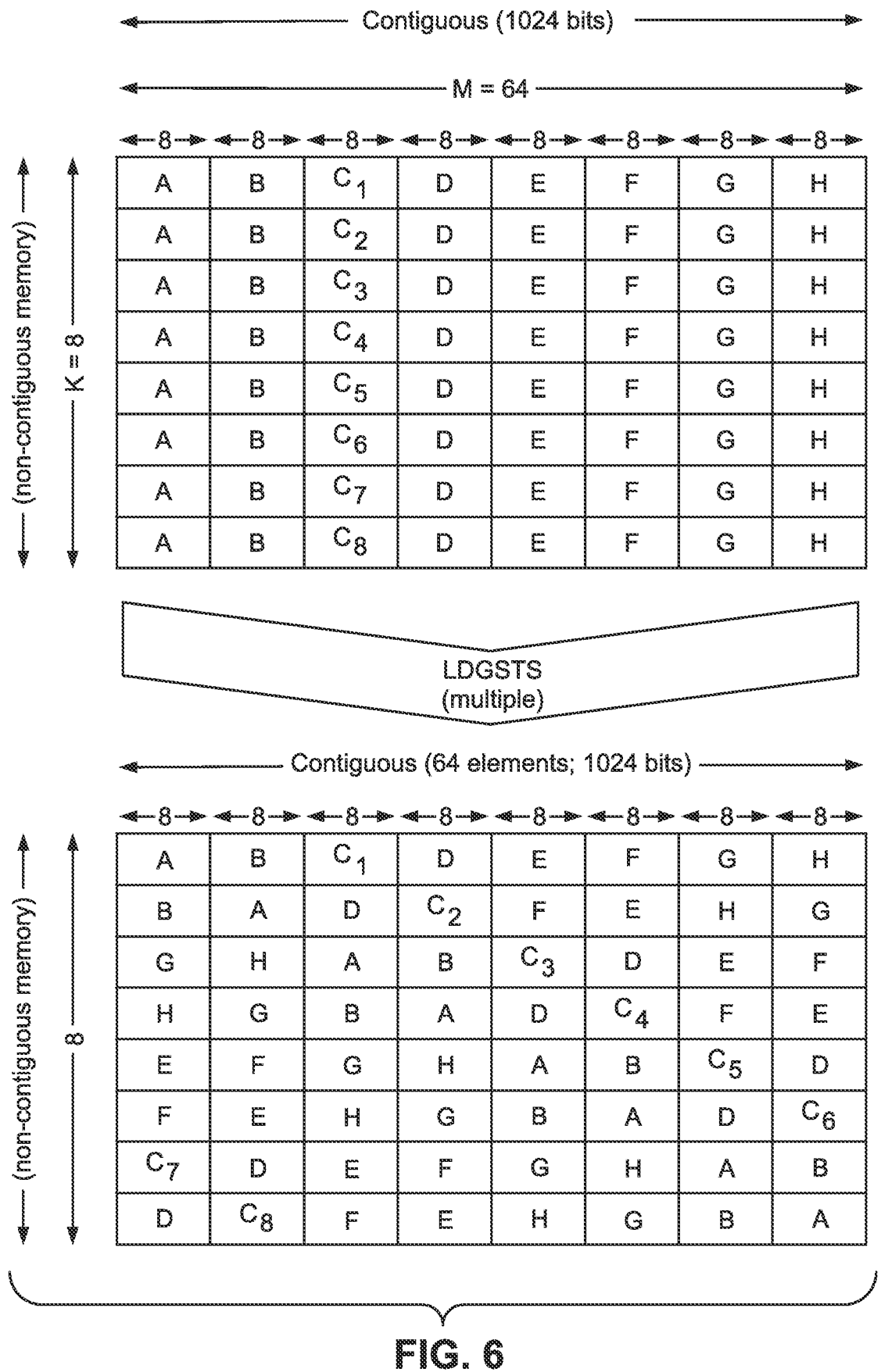
FIG. 6 shows an example representation of how data retrieved from main or global memory can be laid out in shared memory to reduce conflicting requests.

Data can be stored into the shared memory banks such that successive words of a returned cache line map to successive banks. FIG. 6 shows an example representation of how data from global memory can be laid out in shared memory to reduce conflicting requests. The top diagram represents how data can be stored in the global memory and the bottom diagram represents how data can be stored in the shared memory after a fused LDGSTS instruction. Each row in the top diagram corresponds to data as it would be laid out in a cache line (L1 cache or off-chip memory). Each thread would access the global memory in this linear fashion. A block of A's in the global memory may represent 8 two-byte elements wide by 8 elements tall. The block of A's may represent a block of an overall matrix.

When the threads access the cache line, the data is rearranged into the shared memory addresses which are "swizzled." For example, one row is retrieved as laid out in the global memory. Through the shared addresses specified by each thread and encoded into a token sent out with the request and returned with the data, each element of the line is returned and stored in the shared memory along different banks.

As shown in FIG. 6, a row of A's is spread out across the width of the shared memory. This allows for any one of the sub-blocks from a same block to be accessed in a conflict free-way. If all of the data from block A were vertically stacked in the shared memory, they could be read only serially. By spreading them out, access to all of the A blocks can be made without conflict. FIG. 6 also shows how consecutive elements of block C can be distributed into different specific banks of the shared memory.

With data distribution across the banks, when 32 words are read from shared memory including 32 banks, the 32 words can be read from different lines. A similar request to the L1 cache, would be read from a same line. As discussed above, in some implementations, the L1 accesses are restricted up to the number of different non-conflicting lines as the number of tag banks.

FIG. 7 shows exemplary sector patterns that may be applied with shared memory including four sectors. A coalescing buffer may be configured to determine patterns between fill sectors and destination shared memory addresses. The detected patters are optimized for common patterns observed in existing workloads.

The coalescing buffer may be configured to detect and apply a permutation pattern and/or intra sector swizzle when processing the memory transaction. In one example, the 128B global cache lines are further disposed into four 32B sectors. When a global cache line sector is returned (e.g., sector 0) in response to the LDGSTS instruction, the cache line sector may be stored via the interconnect network directly into sector 0 of the shared memory, or rotated and stored into sectors 1, 2, or 3 of the shared memory.

Further, the granularity of how the returned global cache line sector is stored in the shared memory can be controlled. For example, the instructions may be provided with an option to exchange halves of the returned global cache line sector (e.g., store low 16B in the high part of the shared memory sector and the low 16 in the low part of the shared memory sector). In addition, the instruction may write only the low 16B or just the high 16B in the shared memory sector.

When a plurality of threads request data, the coalescing buffer looks at the addresses of the requested data and determines if the requested data belongs to the same cache lines. If the addresses are determined to belong to the same cache line, the requests for the data can be combined and a sector pattern is set, such that when the data is returned the data is stored into different banks of the shared memory. As an example, a first sector is written in an upper portion of the first bank, and shift and rotation is applied so that the next sector is written to a lower portion of the second bank (see e.g., FIG. 6). If the pattern is not recognized, then the hardware can send the requests for data out individually.

The interconnect network 580 can include one or more crossbars including read crossbar and/or write crossbar. The interconnect network 580 support multiple parallel read and write operations, and supports access to data stored in the shared data memory 32 using direct addressing and access to data stored in the L1 data memory 34 using tag lookup. The interconnect network 580 can support a number of simultaneous reads and writes corresponding to the number of banks in the shared memory, L1 cache, and/or registers. In one example, the interconnect network 580 can support a number of simultaneous read and writes that equals the number of memory banks in a data memory storage 30 (e.g., a unified memory).

Splitting Memory Requests

When data requested by a thread exceeds a predetermined size, the memory request may be split into independent requests to provide a certain level of granularity for each request. For example, when a thread requests data that is more than a predetermined size (e.g., 16 or 32 bytes) the thread issuing the load/store request may be forked into one or more helper threads each issuing 16-byte or 32-byte memory requests independently. Each memory request is broken down into cache line requests that are issued independently. The individual threads may be joined after completion of the individual requests.

Fill Byte Zeroing

LDGSTS may support an option (.ZFILL) to zero bytes of the SMEM target address being filled. This is useful if the footprint read by a thread from global memory spans a maximum boundary condition. It is not that the global address is invalid or the data itself is invalid, but that the data being zeroed doesn't apply to the current work product of a given thread. An advantage is that a kernel can use a consistent access bit size (e.g., sz: {0.32, 0.64, 0.128}) without having custom code or branching using fixed-sized loads.

Multiple alternatives can be used for the how the byte zeroing should be specified, e.g., as an explicit mask or byte count in the instruction parameters supplied by the thread. Instead, the .ZFILL option embeds within the global address LSBs indicating how many bytes to zero from the end of the region being stored. This maintains the same parameter movement and BW with non-.ZFILL operations, which enabled minimal design disruption and the same issue performance.

When .ZFILL is specified, global address alignment checks are suspended and alignment is forced to .sz boundary. This frees up $\log_2$(.sz access in bytes) bits of least significant addressing and allows the global address LSBs to be interpreted as a count of how many bytes to zero from the end of the region being stored. When .ZFILL is specified in the instruction, the .ZFILL parameter value can be specified per thread and may uniquely affect the region being stored per thread. The global address is defined as the final sum of (RF+UR+Imm).

Given the count of bytes to zero embedded in the global address LSBs and an access size, a mask may be generated indicating which bytes to keep from the filled data (mask bit=1) or zero (mask bit=0). If .ZFILL is not used, the mask is implied as all 1's.

Store with Byte Write Enable

A complimentary feature to .ZFILL can be provided for global stores to allow bytes to be skipped (.WSKIP) from actually being stored from the data sent per thread. The same technique of embedding the byte count in the global address LSBs can be used, where the count indicated how many bytes to skip writing from the end of the .sz access stored by a given thread. This also allows kernels to use a uniform .sz value (e.g., STG.128.WSKIP) to handle max boundary conditions rather than staging stores of different .sz.

Programming Model and Software Exposure

Simple LDG/STS/Barrier Pattern: A common and relatively straightforward pattern is where threads cooperatively load global data, immediately store it in shared memory and use a barrier synchronization to consume that data. Although memory latency is exposed here, application relies on multi-cooperative thread arrays (CTA) occupancy in SM to hide this exposed latency. This is relatively inefficient use of resources, since all the resources such as threads, register file, shared memory are duplicated. However, the compiler can fuse the LDG and STS operations. The compiler is provided with a mechanism to make barrier synchronization dependent on the STS completion. A scoreboard release capability is provided to LDGSTS instruction so that the barrier instruction can be dependent on that scoreboard register.

Batched load Pattern: An advanced usage pattern is when the threads issue multiple LDG operations followed by multiple STS operations before doing the barrier synchronizations. The fused LDGSTS operations can complete out of order with respect to each other. In order to provide correct dependency tracking for the barrier operation a new instruction called LDGDEPBAR can be added, which fences the completion of all the prior LDGSTS operations.

Software pipelined loads: A more efficient approach to hiding memory latency is to prefetch data ahead of time using software pipelines and loop unrolling. This is achieved by assigning multiple sets of registers for multiple load batches and delaying the corresponding STS operations explicitly. This technique can be hard for compiler to target, especially if it involves hoisting memory operations through barrier. The combination of LDGSTS and LDGDEPBAR makes this process possible.

Since there are no named registers batches to assign/manage, the process of unrolling becomes easier. LDGDEPBAR instruction is defined to have in-order semantics with prior LDGDEPBAR instructions. This borrows a technique used for TEXTURE batch management with DEPBAR dependency tracking.

This process also enabled an even more powerful primitive of asynchronous DMA transfer and shared memory based synchronization objects. In this example, The barrier state object is implemented in shared memory instead of dedicated counters.

Threads can update state with custom atomic operation ATOMS.ARRIVE.64.

Similar to LDGDEPBAR, another fence operation ARRIVES.LDGSTSBAR.64 is defined, which on completion of batch of LDGSTS operations, updates the shared memory barrier object.

These constructs will allow LDGSTS to be exposed as a thread cooperative asynchronous DMA operation, the completion status of which can be queried by querying a shared memory barrier state object. [See U.S. Provisional Patent Application No. 62/927,511 filed Oct. 29, 2019 and U.S. patent application Ser. No. 16/712,236, filed on Dec. 12, 2019, incorporated herein by reference.] This allows the asynchronous DMA transfer to be exploited by application programmers and supported by driver/compiler easily.

When an LDGSTS instruction is issued, the executing thread may fork off a logical helper thread which in turn copies data from global memory to shared memory (without using SM resources like warp slots and register file). However, the helper thread contends for memory bandwidth with the other threads. The executing thread subsequently marks the completion of the helper thread by means of a join operation, which takes one of three forms:

1. ARRIVES.LDGSTSBAR used with an Arrive-Wait-Barrier
2. Batch counting scoreboards implemented using LDGDEPBAR and DEPBAR.LE
3. &req on a write scoreboard (which is updated by the LDGSTS instruction)

Instruction Issue Order

All instructions before LDGSTS can be issued before the helper thread is forked off. There may be no guaranteed execution order between a) the helper thread and b) instructions in the executing thread between the LDGSTS instruction and the join instruction. The helper thread is guaranteed to complete before the executing thread issues instructions which succeed the join operation in program order.

BAR instructions in the executing thread (before the LDGSTS instruction, between the LDGSTS instruction and the join operation or after the join operation) do not guarantee anything else about the execution order of the helper thread. In other words, the helper threads, which do not belong to the CTA of the executing thread, do not take part in CTA wide synchronization barriers like BAR.SYNC and BAR.SYNCALL.

Example Non-Limiting Parallel Processing GPU Architecture for Performing the Operations and Processing Described Above An example illustrative architecture which can be directed by the load and store to shared memory instructions disclosed in this application will now be described. The following information is set forth for illustrative purposes and should not be construed as limiting in any manner. Any of the following features may be optionally incorporated with or without the exclusion of other features described.

Figure 8:
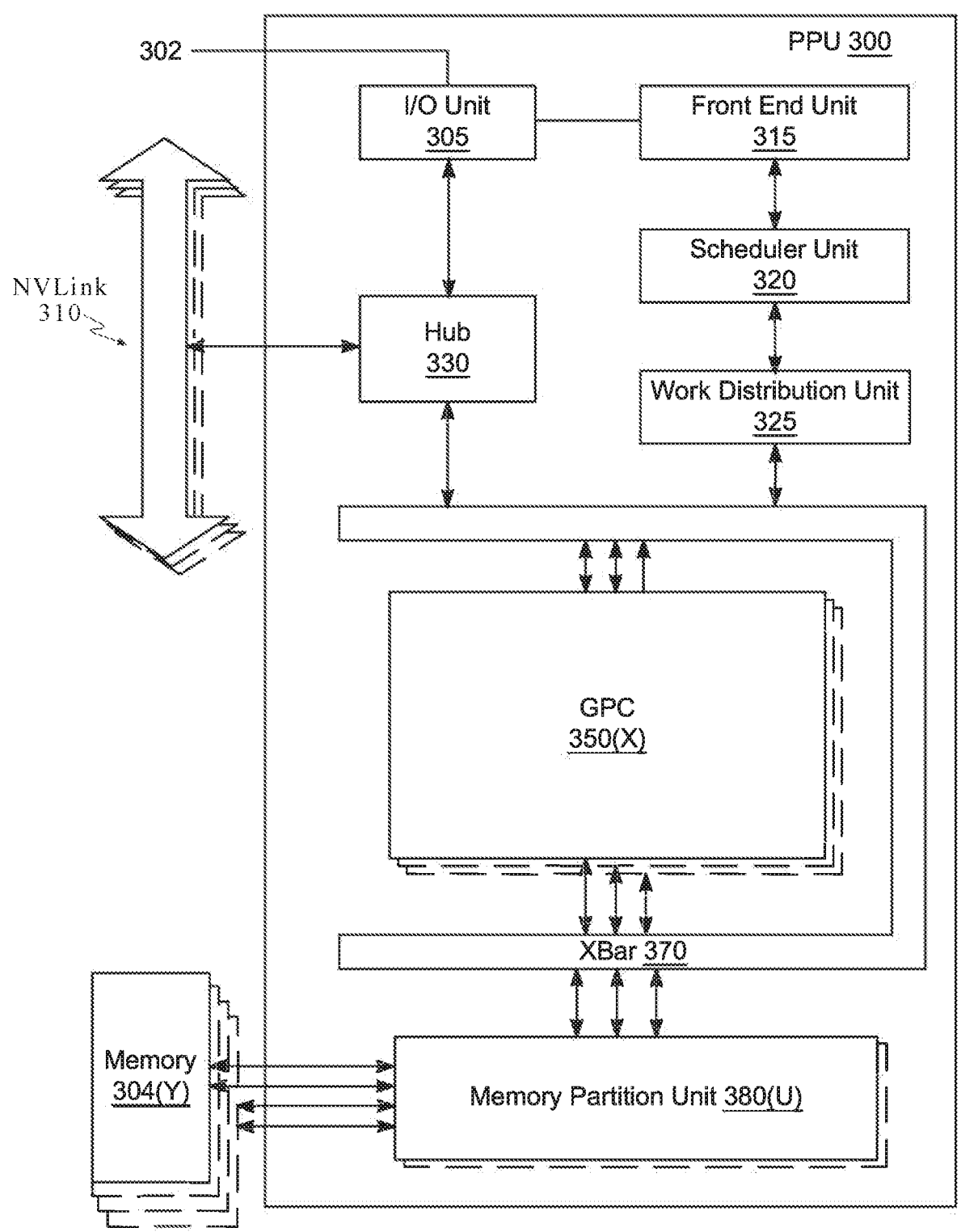
FIG. 8 illustrates an example parallel processing unit.

FIG. 8 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 8, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 10B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more of the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 9B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 9A:
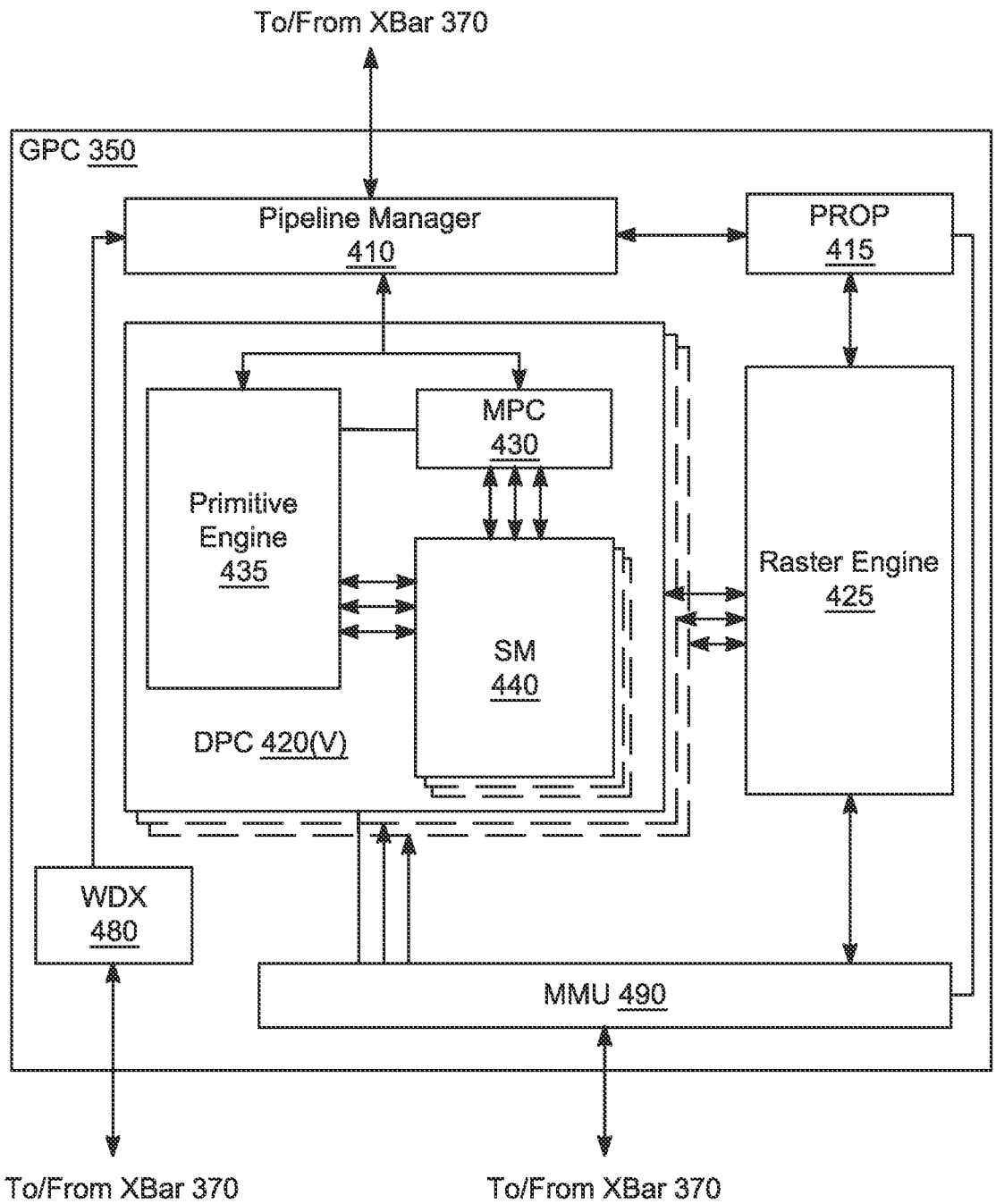
FIG. 9A illustrates an example general processing cluster within the parallel processing unit of FIG. 8.

FIG. 9A illustrates a GPC 350 of the PPU 300 of FIG. 8, in accordance with an embodiment. As shown in FIG. 9A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 9A may include other hardware units in lieu of or in addition to the units shown in FIG. 9A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 9B:
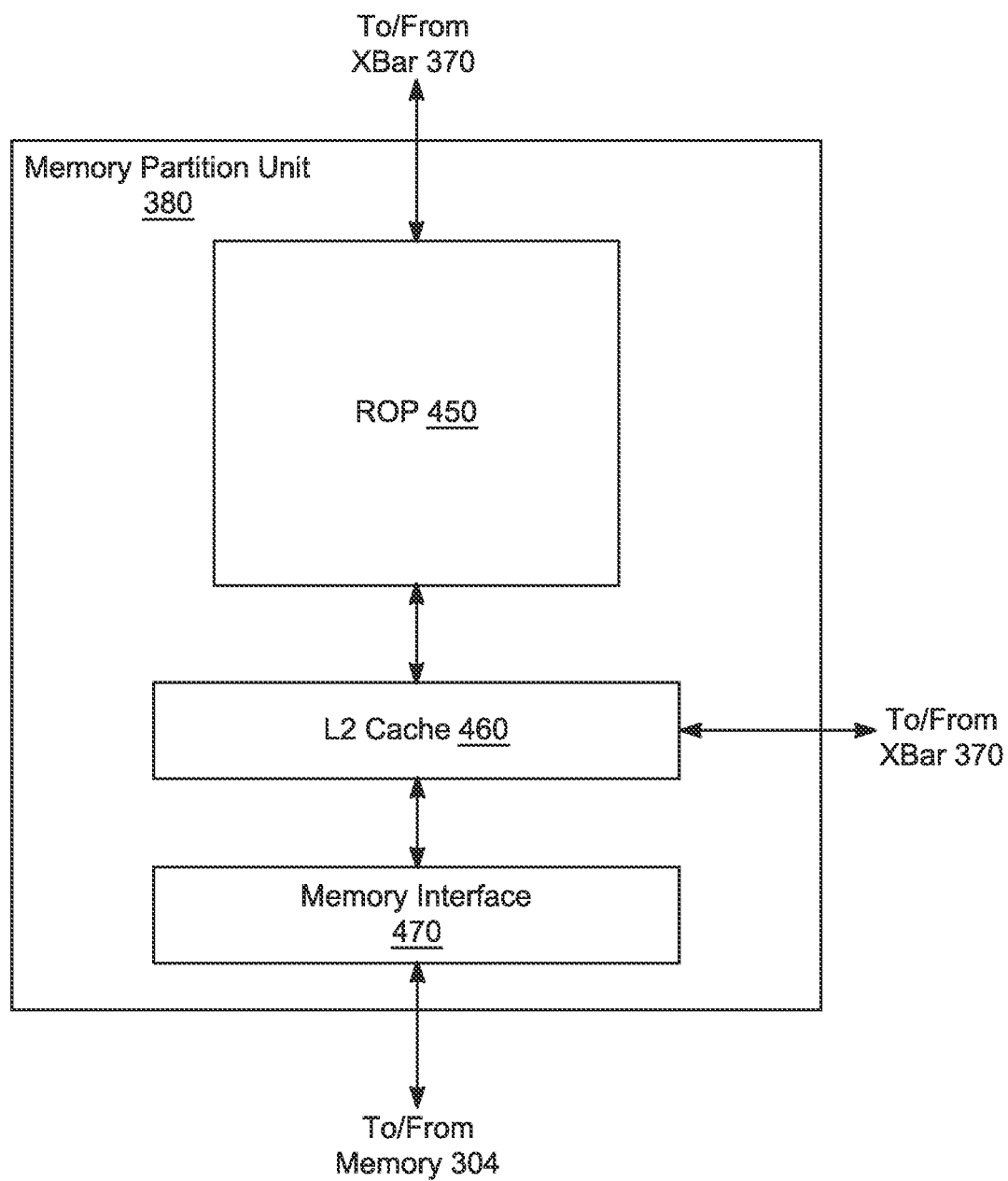
FIG. 9B illustrates an example memory partition unit of the parallel processing unit of FIG. 8.

The PROP unit 415 is configured to route data generated by the raster engine 425 and the DPCs 420 to a Raster Operations (ROP) unit, described in more detail in conjunction with FIG. 9B. The PROP unit 415 may also be configured to perform optimizations for color blending, organize pixel data, perform address translations, and the like.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 11:
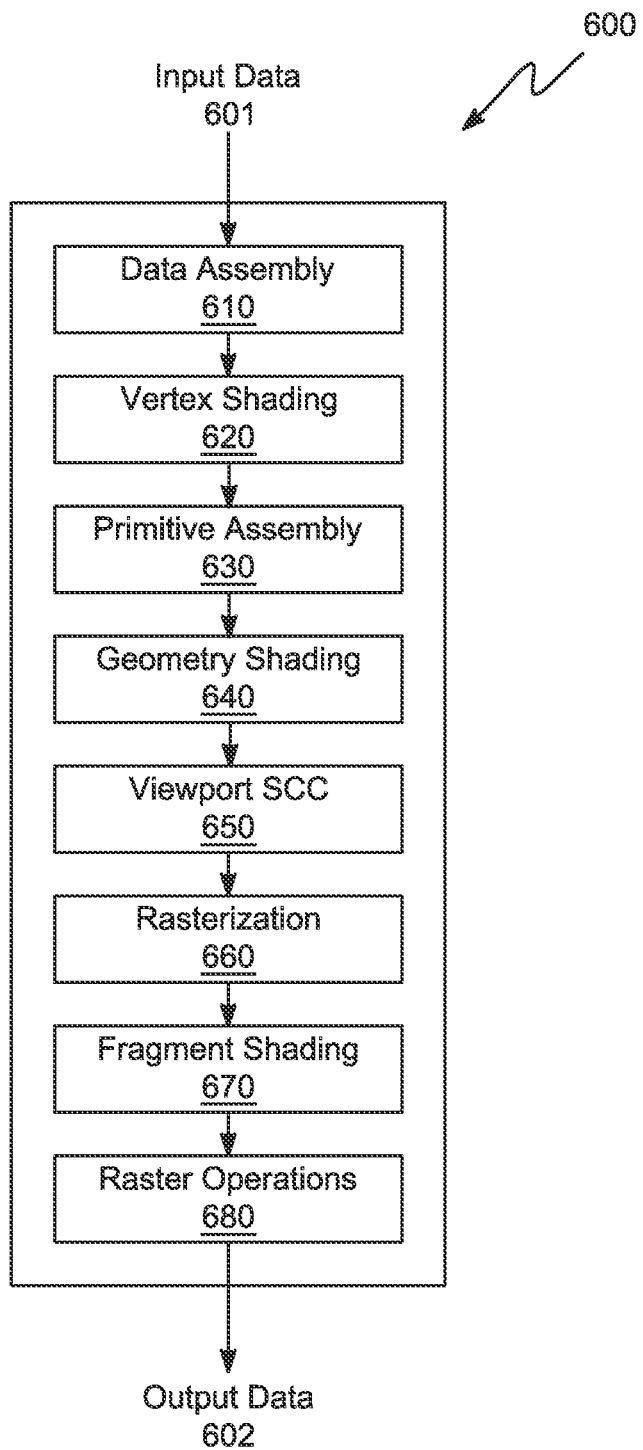
FIG. 11 is a conceptual diagram of an example graphics processing pipeline implemented by the PPU of FIG. 8, in accordance with an embodiment.

FIG. 11 is a conceptual diagram of a graphics processing pipeline 600 implemented by the PPU 300 of FIG. 8, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 11, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. As described above, the software shading algorithms that work in connection with such shading hardware can be optimized to reduce computation time.

In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g., capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like. The raster engine 425 this includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and non-culled fragments are transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 10A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 9B illustrates a memory partition unit 380 of the PPU 300 of FIG. 8, in accordance with an embodiment. As shown in FIG. 9B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 9B, in other embodiment, the ROP unit 450 may be outside of the memory partition unit 380. For example, the ROP unit 450 may reside in the GPC 350 or another unit.

Figure 10A:
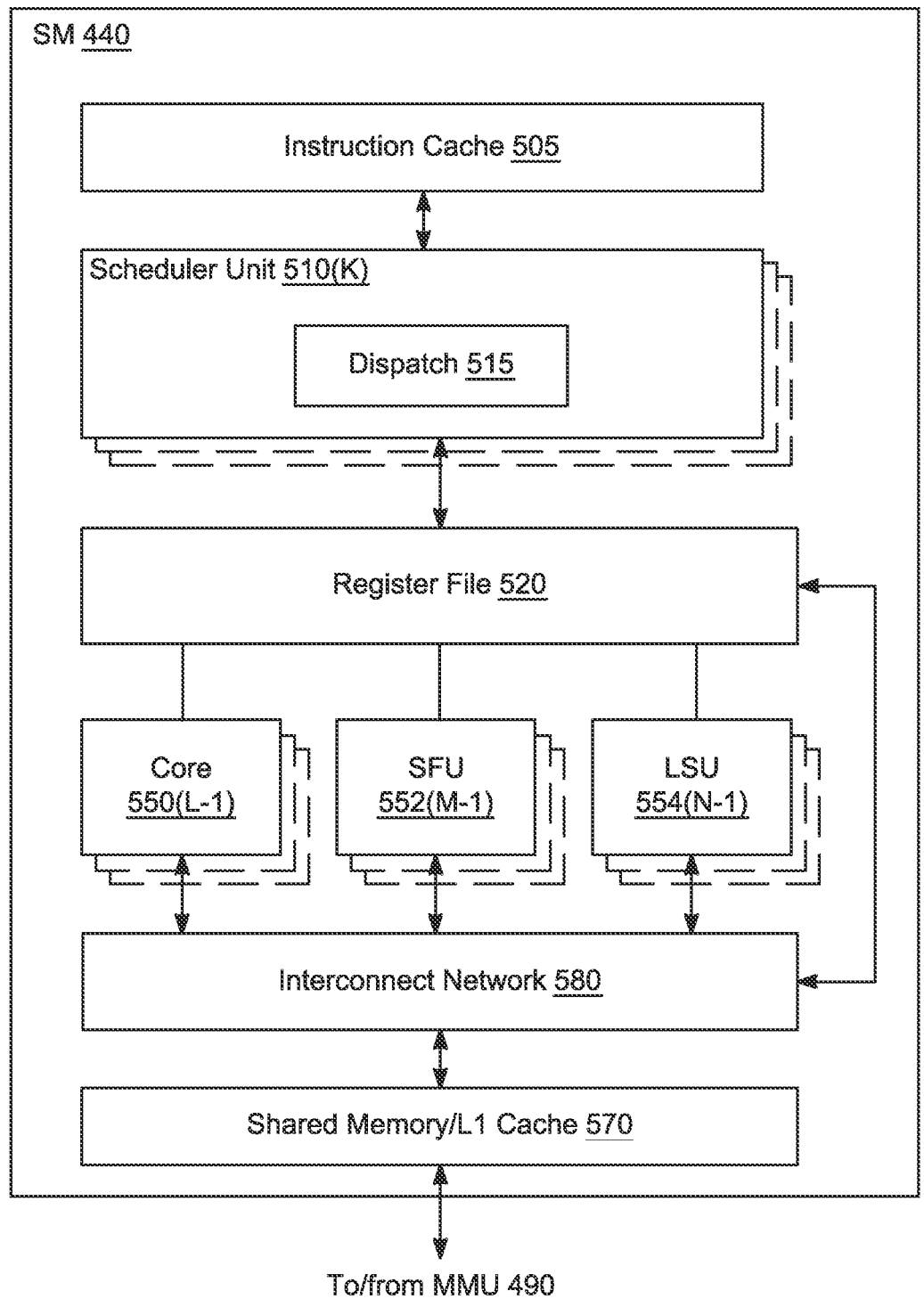
FIG. 10A illustrates an example streaming multiprocessor of FIG. 9A.

FIG. 10A illustrates the streaming multiprocessor 440 of FIG. 9A, in accordance with an embodiment. As shown in FIG. 10A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A□B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

In some embodiments, transposition hardware is included in the processing cores 550 or another functional unit (e.g., SFUs 552 or LSUs 554) and is configured to generate matrix data stored by diagonals and/or generate the original matrix and/or transposed matrix from the matrix data stored by diagonals. The transposition hardware may be provide inside of the shared memory 570 to register file 520 load path of the SM 440.

In one example, the matrix data stored by diagonals may be fetched from DRAM and stored in the shared memory 570. As the instruction to perform processing using the matrix data stored by diagonals is processed, transposition hardware disposed in the path of the shared memory 570 and the register file 520 may provide the original matrix, transposed matrix, compacted original matrix, and/or compacted transposed matrix. Up until the very last storage prior to instruction, the single matrix data stored by diagonals may be maintained, and the matrix type designated by the instruction is generated as needed in the register file 520.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file 520 and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 10B:
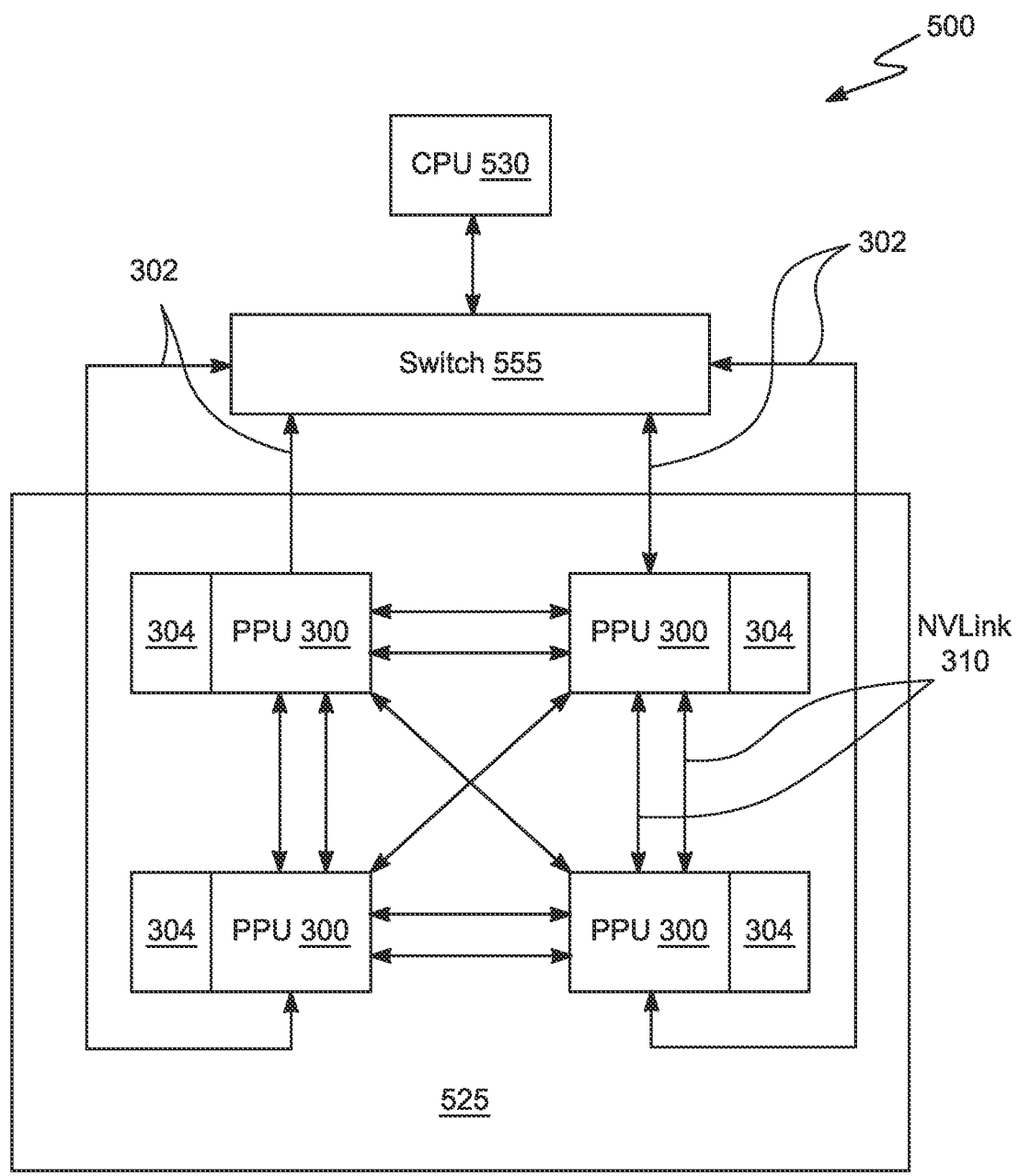
FIG. 10B is an example conceptual diagram of a processing system implemented using the parallel processing unit (PPU) of FIG. 8.

FIG. 10B is a conceptual diagram of a processing system 500 implemented using the PPU 300 of FIG. 8, in accordance with an embodiment. The exemplary system 500 may be configured to implement the methods disclosed in this application (e.g., methods shown in FIG. 5, 6, or 8). The processing system 500 includes a CPU 530, switch 555, and multiple PPUs 300 each and respective memories 304. The NVLink 310 provides high-speed communication links between each of the PPUs 300. Although a particular number of NVLink 310 and interconnect 302 connections are illustrated in FIG. 10B, the number of connections to each PPU 300 and the CPU 530 may vary. The switch 555 interfaces between the interconnect 302 and the CPU 530. The PPUs 300, memories 304, and NVLinks 310 may be situated on a single semiconductor platform to form a parallel processing module 525. In an embodiment, the switch 555 supports two or more protocols to interface between various different connections and/or links.

In another embodiment (not shown), the NVLink 310 provides one or more high-speed communication links between each of the PPUs 300 and the CPU 530 and the switch 555 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 555 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 555. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 555, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 10B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 10B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 10C:
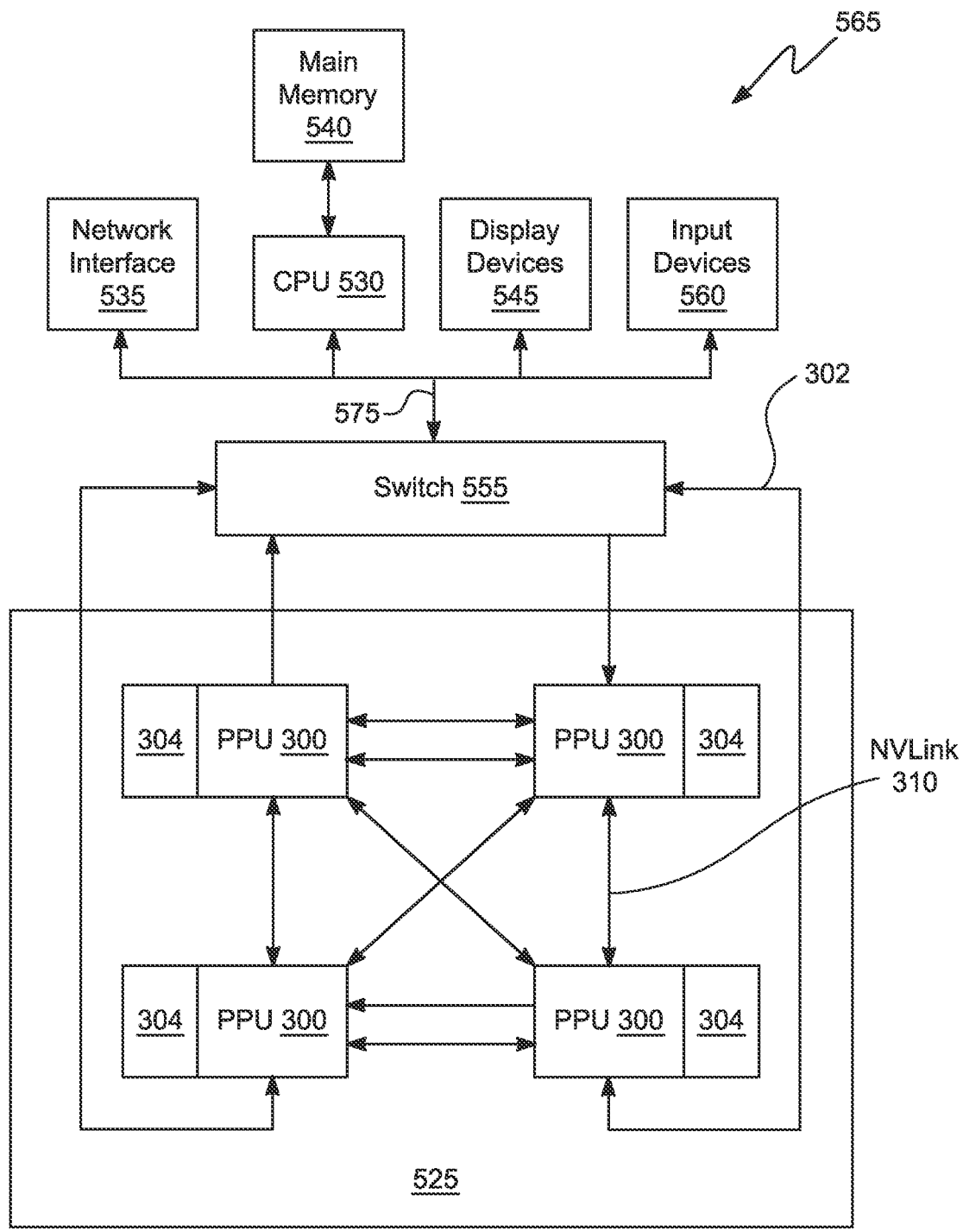
FIG. 10C is a block diagram of an exemplary system in which the various architecture and/or functionality of the various previous embodiments may be implemented.

FIG. 10C illustrates an exemplary system 565 in which the various architecture and/or functionality of the various previous embodiments may be implemented. The exemplary system 565 may be configured to implement the methods disclosed in this application (e.g., methods shown in FIG. 5, 6, or 8).

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

All patents and printed publications referred to above are incorporated by reference herein as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A processing system comprising:
    a multithreaded processor configured to concurrently execute a plurality of threads;
    a plurality of data registers, each of the data registers assigned to executing threads; and
    on-chip memory including a cache memory and a shared memory,
    wherein the system is configured to, in response to at least one of the threads, execute a first instruction to retrieve data stored in a memory external to the processing system through the data registers and the cache memory and store the data into the shared memory, and in response to at least one of the threads, execute a second instruction to retrieve data stored in the memory external to the processing system and store the data into the shared memory without first storing the data in the data registers.

2. The processing system of claim 1, wherein the cache memory is configured to allow the plurality of executing threads to access tagged data stored in the cache memory, and the shared memory is configured to allow the plurality of executing threads to access untagged data stored in the shared memory.

3. The processing system of claim 2, wherein the shared memory is a software managed cache.

4. The processing system of claim 3, wherein the cache memory and the shared memory are a unified physical random access memory.

5. The processing system of claim 4, wherein the unified physical random access memory includes a register file including the plurality of data registers dynamically assignable to the executing threads.

6. The processing system of claim 1, wherein the processing system includes hardware circuitry configured to: receive a plurality of instructions to load data stored in the external memory and store the data into the shared memory, and determine, based on the plurality of instructions, a shared memory sector fill pattern for storing the retrieved data in the shared memory.

7. The processing system of claim 1, wherein the shared memory includes a plurality of sectors arranged in banks, and the retrieved data is stored into at least one of the sectors with an intra-sector swizzle.

8. The processing system of claim 1, wherein the shared memory includes a plurality of sectors arranged in banks, and portions of the retrieved data are stored into the sectors in different banks.

9. The processing system of claim 1, wherein the second instruction loads data from one sector of the external memory and stores the loaded data into parts of plural sectors in the shared memory.

10. The processing system of claim 1, wherein the retrieved data is stored in one or more cache lines of the cache memory and the system further comprises an interconnect circuit configured to transfer data stored in the one or more cache lines into sectors of the shared memory without first storing the retrieved data in the plurality of data registers.

11. A processing system comprising:
    a multithreaded processor configured to concurrently execute a plurality of threads;
    a plurality of data registers, each of the data registers assigned to executing threads; and
    on-chip memory including a cache memory and a shared memory,
    wherein the system is configured to, in response to at least one of the threads, execute a first instruction to retrieve data stored in a memory external to the processing system through the data registers and the cache memory and store the data into the shared memory, and in response to at least one of the threads, execute a second instruction to retrieve data stored in the memory external to the processing system and store the data into the shared memory without first storing the data in the data registers and the cache memory.

12. The processing system of claim 11, wherein the cache memory is configured to allow the plurality of executing threads to access tagged data stored in the cache memory, and the shared memory is configured to allow the plurality of executing threads to access untagged data stored in the shared memory.

13. The processing system of claim 12, wherein the shared memory is a software managed cache.

14. The processing system of claim 12, wherein the cache memory and the shared memory are a unified physical random access memory.

15. The processing system of claim 14, wherein the unified physical random access memory includes a register file including the plurality of data registers dynamically assignable to the executing threads.

16. A method performed by a processing system comprising: a multithreaded processor configured to concurrently execute a plurality of threads; a plurality of data registers, each of the data registers assigned to executing threads; and on-chip memory including a cache memory and a shared memory, the method comprising:
    at least one of the threads executing a first instruction to retrieve data stored in a memory external to the processing system through the data registers and the cache memory and store the data into the shared memory; and
    at least one of the threads executing a second instruction to retrieve data stored in the memory external to the processing system and store the data into the shared memory without first storing the data in the plurality of data registers.

17. The method of claim 16, wherein the cache memory is configured to allow the plurality of executing threads to access tagged data stored in the cache memory, and the shared memory is configured to allow the plurality of executing threads to access untagged data stored in the shared memory.

18. The method of claim 17, wherein the shared memory is a software managed cache.

19. The method of claim 17, wherein the cache memory and the shared memory are a unified physical random access memory.

20. The method of claim 19, wherein the unified physical random access memory includes a register file including the plurality of data registers dynamically assignable to the executing threads.

21. The method of claim 16, wherein the second instruction loads data from one sector of the external memory and stores the loaded data into parts of plural sectors in the shared memory.

* * * * *